(12) United States Patent  (10) Patent No.: US 6,336,771 B1
Hill  (45) Date of Patent: Jan. 8, 2002

(54) ROTATABLE WAVE-FORMING APPARATUS

(76) Inventor: Kenneth D. Hill, 206 E. Liberty St., Ashland, OH (US) 44805

( * ) Notice: Subject to any disclaimer, the term of this patent is extended or adjusted under 35 U.S.C. 154(b) by 0 days.

(21) Appl. No.: 09/477,070

(22) Filed: Jan. 3, 2000

Related U.S. Application Data

(63) Continuation-in-part of application No. 08/944,401, filed on Oct. 6, 1997, now Pat. No. 6,019,547.
(60) Provisional application No. 60/028,002, filed on Oct. 8, 1996.

(51) Int. Cl.$^7$ .............................. E02B 3/00; A63G 31/00
(52) U.S. Cl. ........................ 405/79; 405/52; 472/128; 4/491
(58) Field of Search .................. 405/52, 79; 4/491, 4/506; 472/88, 128

(56) References Cited

U.S. PATENT DOCUMENTS

| | | |
|---|---|---|
| 586,718 A | 7/1897 | Wharton, Jr. .................. 4/491 |
| 765,093 A | 7/1904 | Miller |
| 1,076,779 A | 10/1913 | Miller et al. |
| 1,143,352 A | 6/1915 | Boecker |
| 1,701,842 A | 2/1929 | Fisch |
| 2,815,591 A | 12/1957 | Mattingly |
| 2,815,951 A | * 12/1957 | Baldanza ..................... 434/253 |
| 3,125,339 A | * 3/1964 | Nielsen ........................ 472/13 |
| 3,350,724 A | 11/1967 | Leigh ............................ 4/491 |
| 3,557,559 A | 1/1971 | Barr ............................ 405/79 |
| 3,598,402 A | 8/1971 | Frenzi |
| 3,635,448 A | 1/1972 | Okada |
| 3,802,697 A | 4/1974 | Le Mehaute .............. 405/79 X |
| 3,820,760 A | 6/1974 | Milik |
| 3,913,332 A | 10/1975 | Forsman |
| 4,142,258 A | 3/1979 | Schiron et al. ............ 4/172.16 |
| 4,199,274 A | 4/1980 | Loth |
| 4,301,717 A | 11/1981 | Knees |
| 4,406,162 A | 9/1983 | Hark ........................ 4/491 X |
| 4,549,837 A | 10/1985 | Hebert |

(List continued on next page.)

FOREIGN PATENT DOCUMENTS

| | | | |
|---|---|---|---|
| JP | 52-41392 | 3/1977 | ........... A63B/69/00 |
| WO | WO-8702264 | * 4/1987 | ................. 472/128 |

OTHER PUBLICATIONS

Hornung et al., "A stationary oblique breaking wave for laboratory testing of surfboards" *J. Fluid Mech.* (1976), vol. 78, part 3, pp. 459–480.

Killen et al., "A Facility for Wave Riding Research" Eighth Australasian Fluid Mechanics Conference, University of Newcastle, N.S.W., Nov. 28/Dec. 2, 1983, pp. 2B.1–2B.4.

Dunn, "Wave Action Rivers" Splash Magazine, Jan. 1992, vol. XI, No. 1, pp. 15–16.

Killen, "Model Studies for a Wave Riding Facility" 7$^{th}$ Australasian Hydraulics and Fluid Mechanics Conference, Brisbane, Aug. 1980, pp. 51–55.

*Primary Examiner*—David Bagnell
*Assistant Examiner*—Jong-Suk Lee
(74) *Attorney, Agent, or Firm*—Kilyk & Bowersox, P.L.L.C.

(57) ABSTRACT

A rotating surfing wave simulator and methods of making surfable waves are provided. The simulator includes a rotatable container of water and a power source for rotating the container. A water-shaping aerofoil structure is disposed in the container for shaping the body of water. A wave-forming device is also provided adjacent and trailing the aerofoil structure, and includes an inclined surface. The aerofoil structure and wave-forming device together form a surfable wave upon rotation of the body of water in the container. Transparent structures may be used to enable spectators to view, from the side or underside, a surfer riding a wave formed on the wave-forming device. Wave enhancing devices are also provided to vary the shape of the surfable wave.

17 Claims, 13 Drawing Sheets

U.S. PATENT DOCUMENTS

| | | |
|---|---|---|
| 4,665,853 A | 5/1987 | Gerdsen et al. |
| 4,669,687 A | 6/1987 | Rudolph |
| 4,706,910 A | 11/1987 | Walsh et al. |
| 4,725,026 A | 2/1988 | Krafka et al. |
| 4,792,260 A | 12/1988 | Sauerbier .................... 405/79 |
| 4,830,315 A | 5/1989 | Presz, Jr. et al. |
| 4,863,121 A | 9/1989 | Savill |
| 4,865,271 A | 9/1989 | Savill |
| 4,954,014 A | 9/1990 | Sauerbier et al. |
| 4,986,784 A | 1/1991 | French |
| 4,997,311 A | 3/1991 | Van Doren |
| 5,133,516 A | 7/1992 | Marentic et al. |
| RE34,042 E | 8/1992 | Merino |
| 5,171,101 A | 12/1992 | Sauerbier et al. ............. 405/79 |
| 5,205,670 A | 4/1993 | Hill |
| 5,213,547 A | 5/1993 | Lochtefeld |
| 5,219,315 A | 6/1993 | Fuller et al. |
| 5,222,699 A | 6/1993 | Albach et al. |
| 5,236,280 A | 8/1993 | Lochtefeld |
| 5,263,793 A | 11/1993 | Sirovich et al. |
| 5,271,692 A | 12/1993 | Lochtefeld |
| 5,342,145 A | 8/1994 | Cohen |
| 5,366,177 A | 11/1994 | DeCoux |
| 5,366,180 A | 11/1994 | Wainfan et al. |
| 5,386,955 A | 2/1995 | Savill |
| 5,387,159 A * | 2/1995 | Hilgert et al. ............... 472/128 |
| 5,393,170 A | 2/1995 | Lochtefeld |
| 5,395,071 A | 3/1995 | Felix |
| 5,398,628 A | 3/1995 | Rethorst |
| 5,401,117 A | 3/1995 | Lochtefeld |
| 5,421,702 A | 6/1995 | Revak et al. |
| 5,421,782 A | 6/1995 | Lochtefeld .............. 472/128 X |
| 5,453,054 A | 9/1995 | Langford .................. 405/79 X |
| 5,478,281 A | 12/1995 | Forton |
| 5,503,597 A | 4/1996 | Lochtefeld et al. |
| 5,540,406 A | 7/1996 | Occhipinti |
| 5,542,630 A | 8/1996 | Savill |
| 5,564,859 A | 10/1996 | Lochtefeld |
| 5,628,584 A | 5/1997 | Lochtefeld .................... 405/79 |
| 5,664,910 A | 9/1997 | Lochtefeld et al. |
| 5,667,445 A | 9/1997 | Lochtefeld |
| 5,738,590 A | 4/1998 | Lochtefeld |
| 5,766,082 A | 6/1998 | Lochtefeld et al. |
| 5,860,766 A | 1/1999 | Lochtefeld et al. |
| 5,899,633 A | 5/1999 | Lochtefeld |
| 5,899,634 A | 5/1999 | Lochtefeld |
| 5,911,190 A | 6/1999 | Lochtefeld et al. |

\* cited by examiner

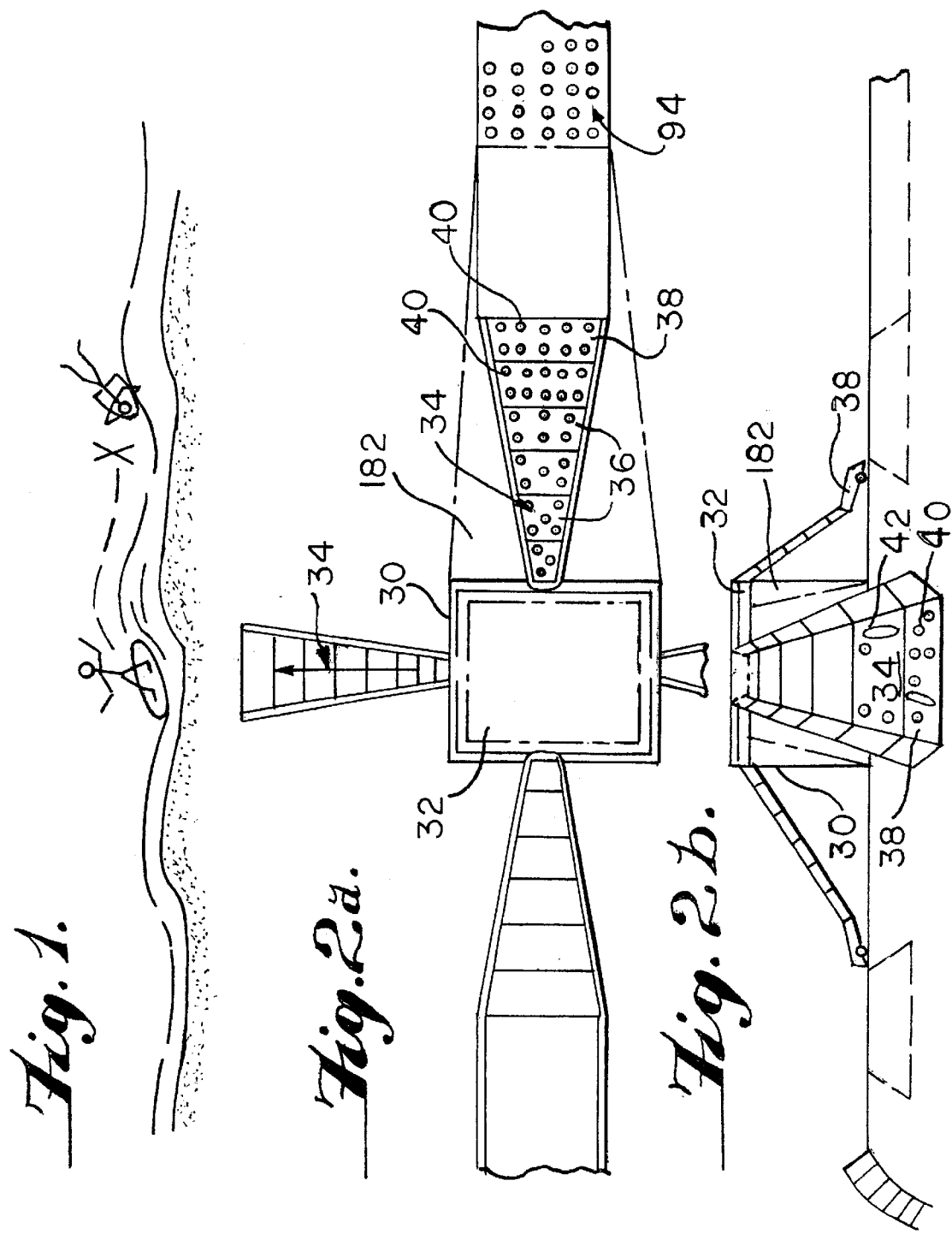

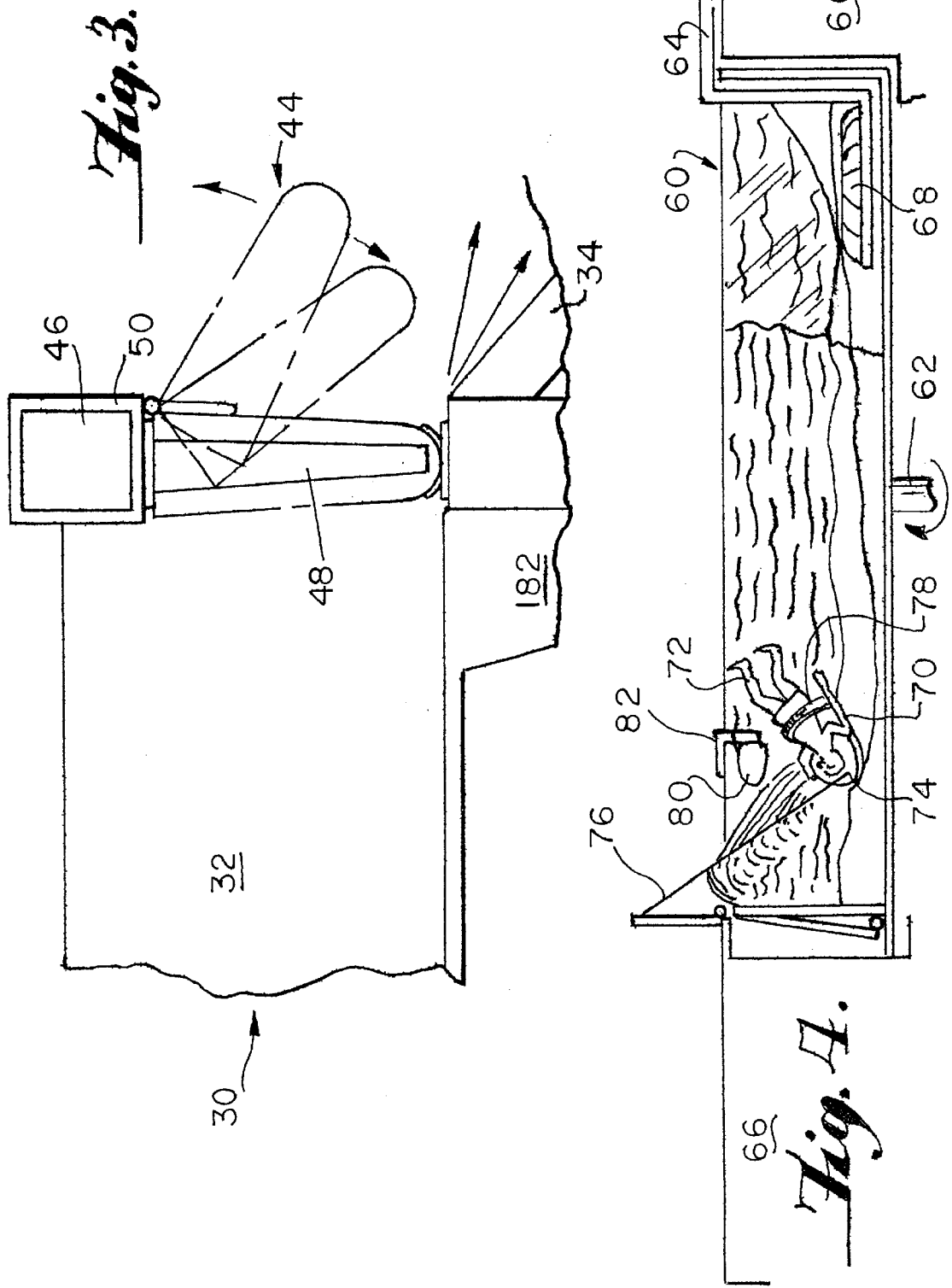

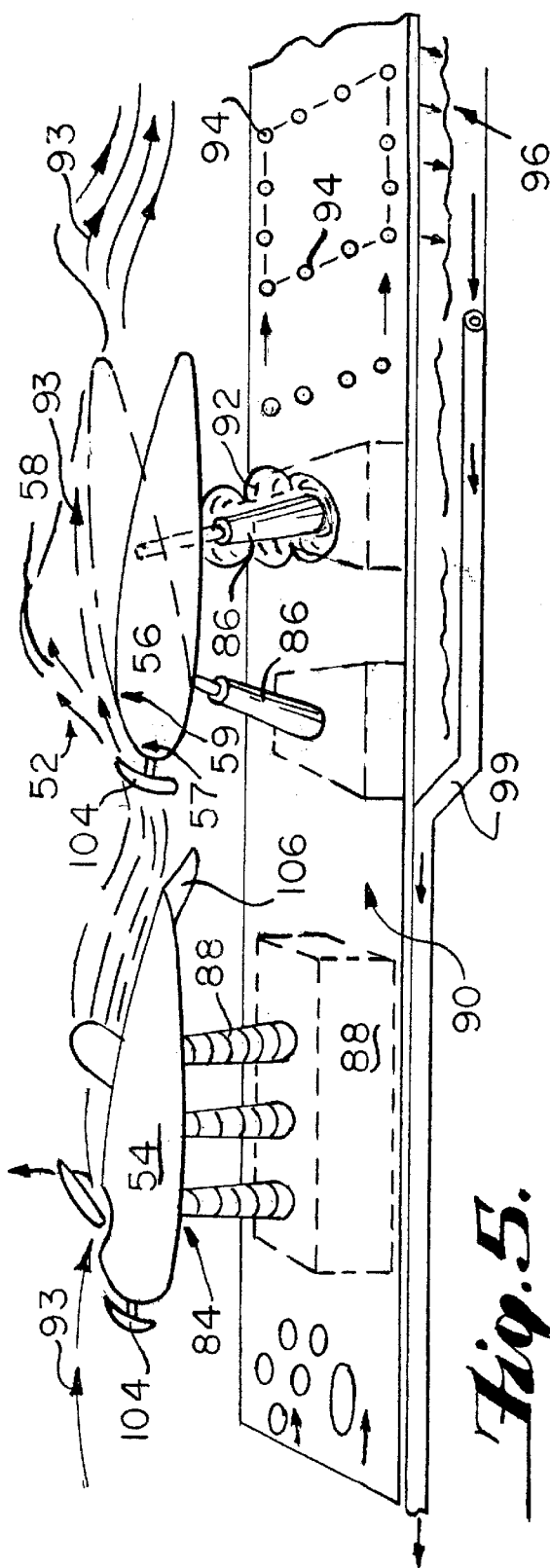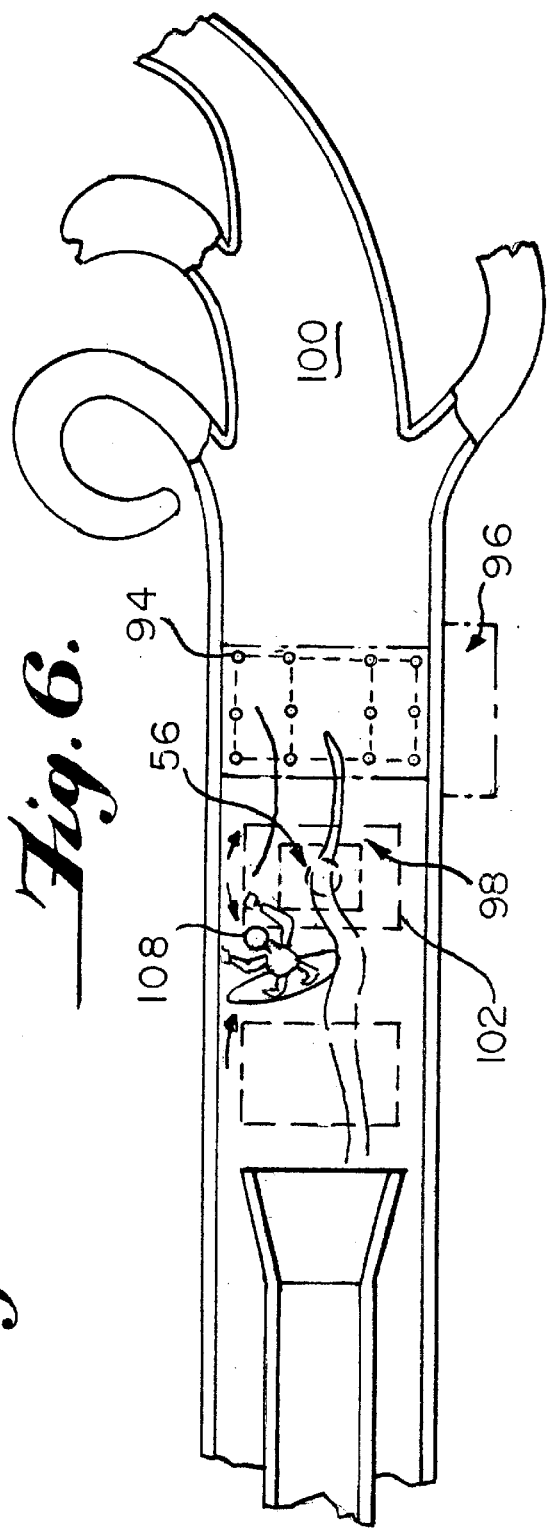

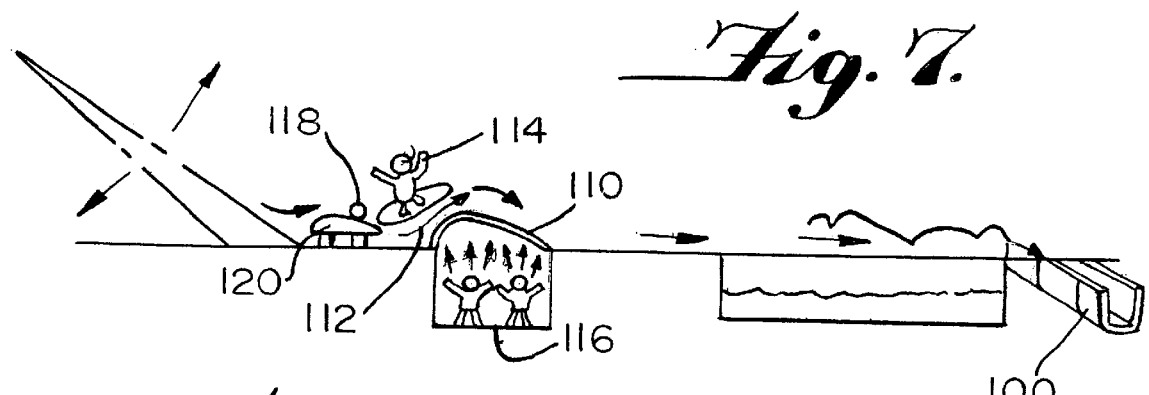
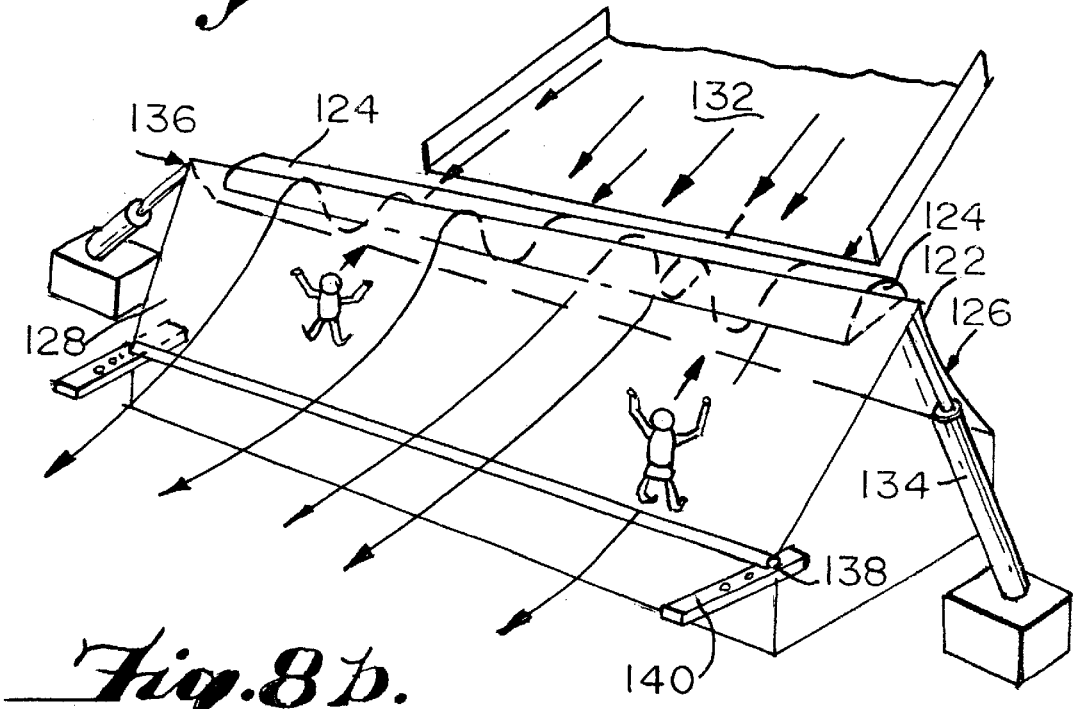
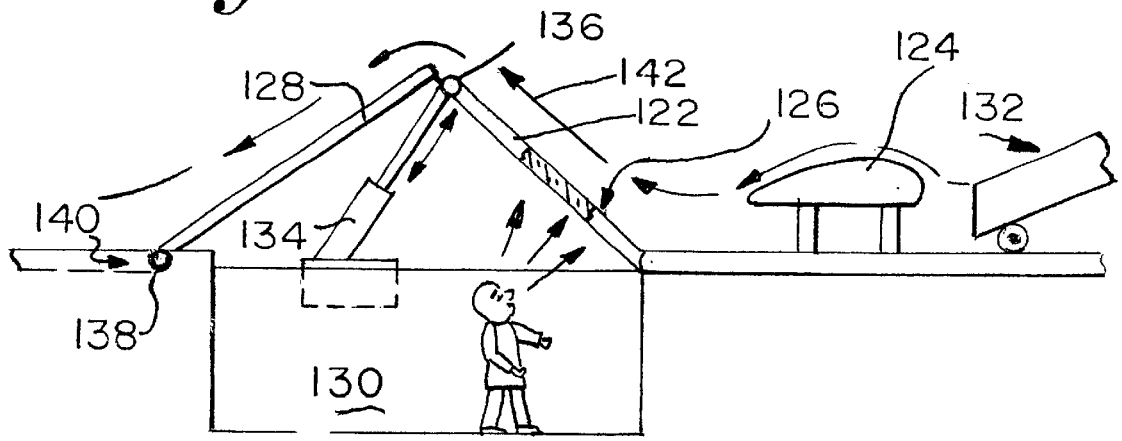

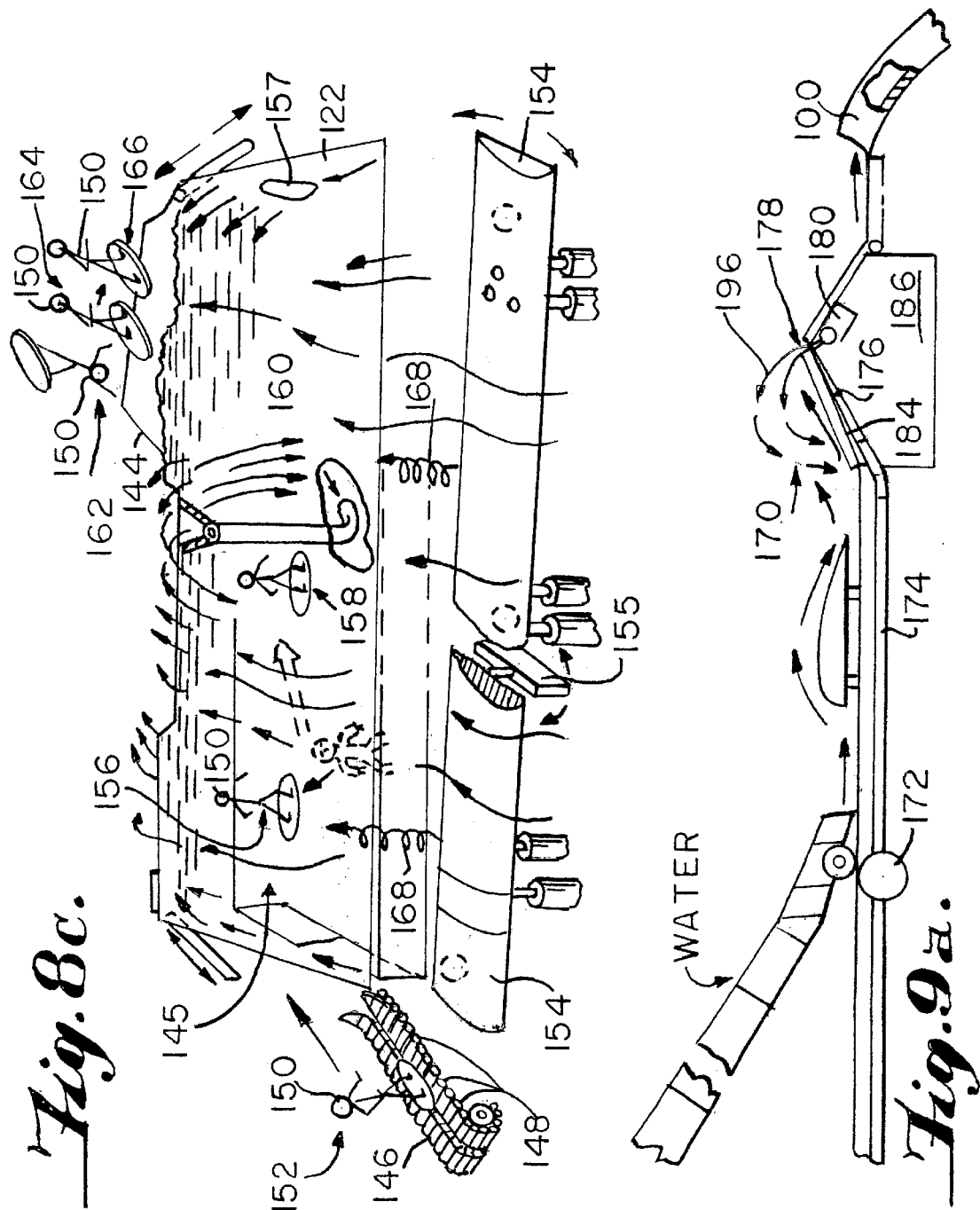

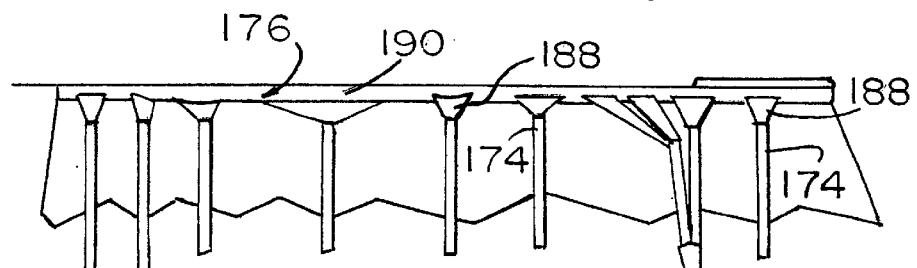
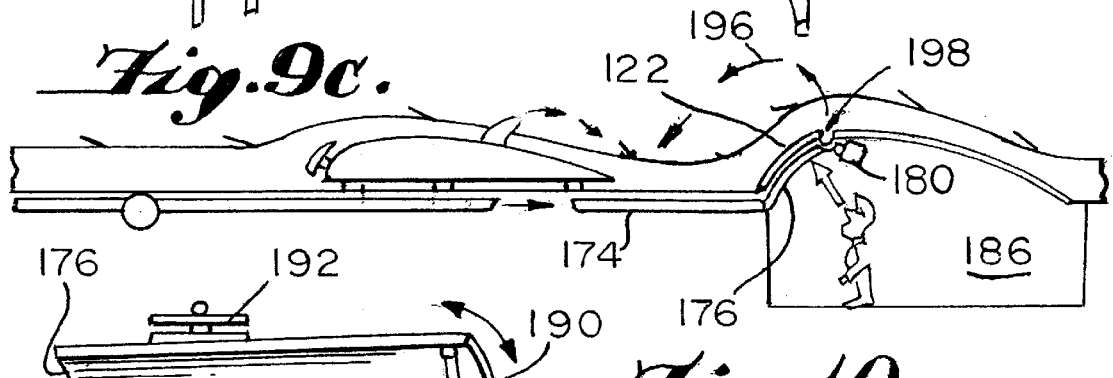
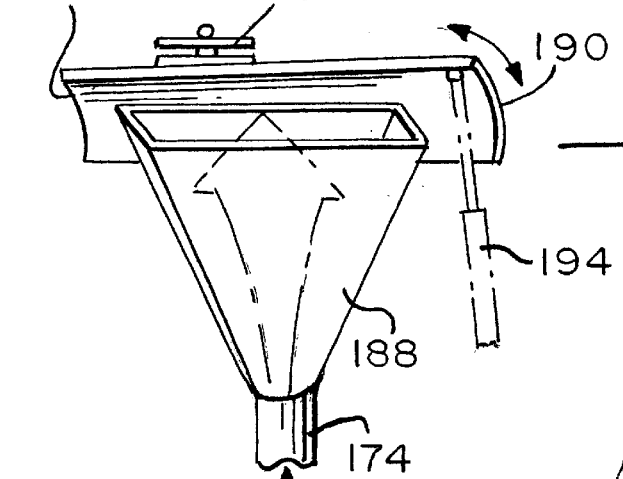
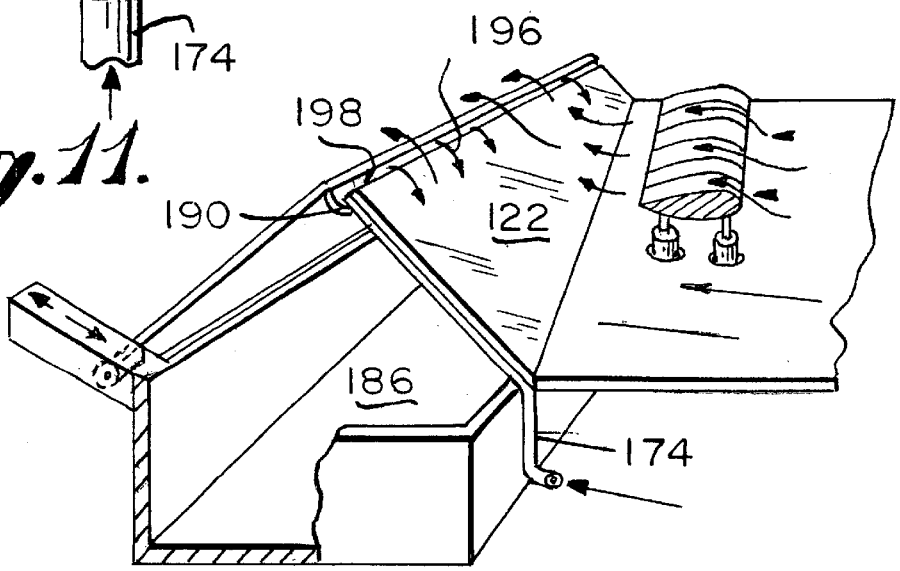

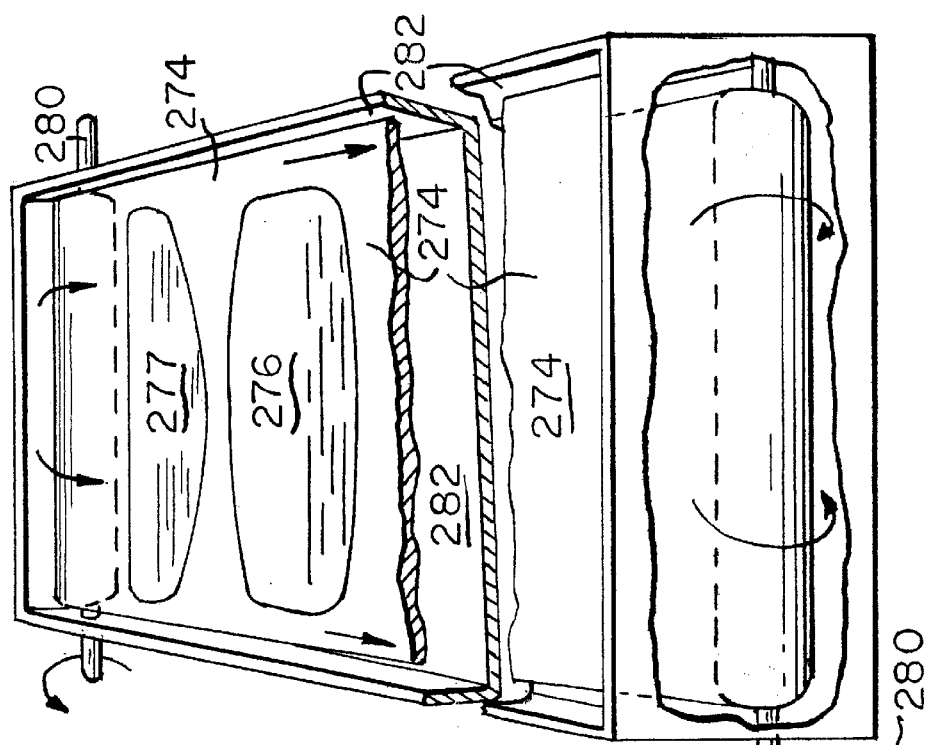
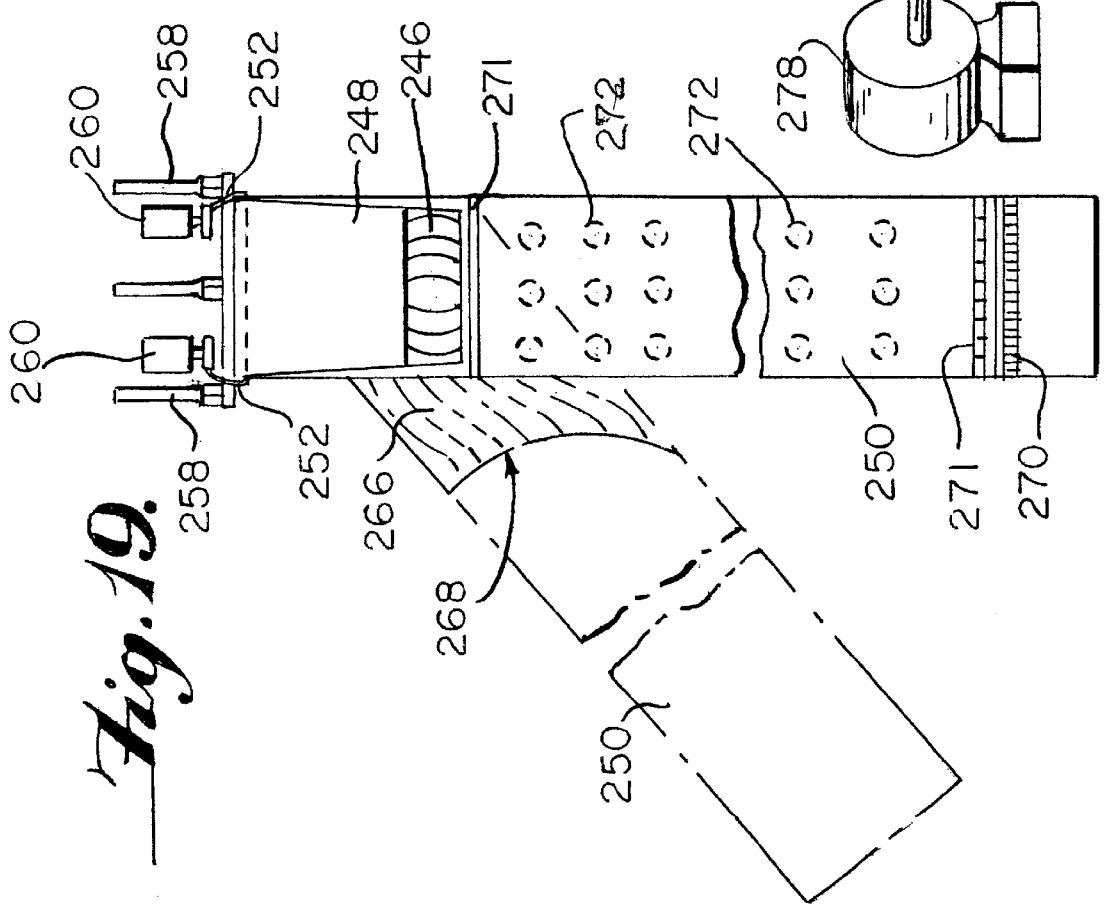

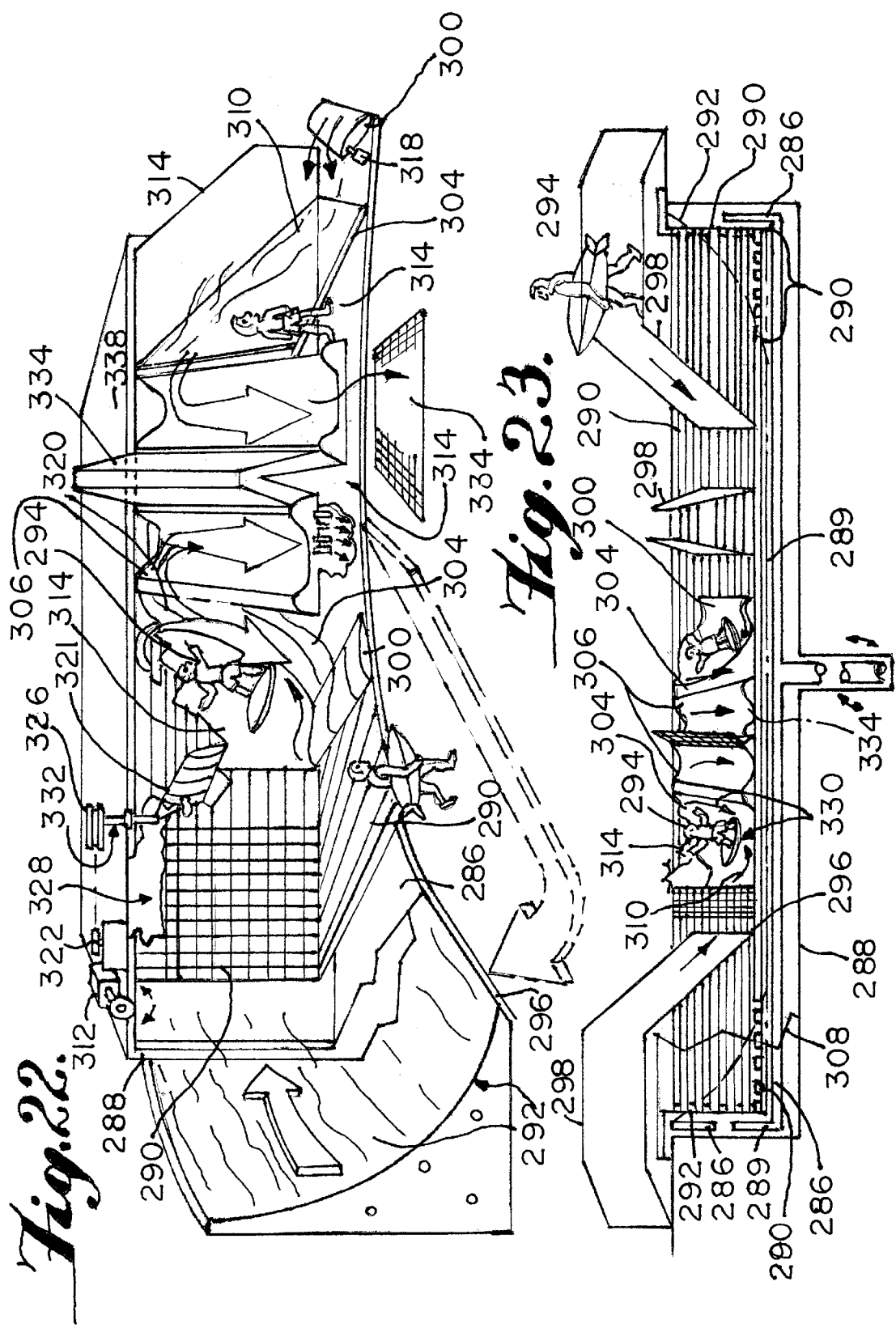

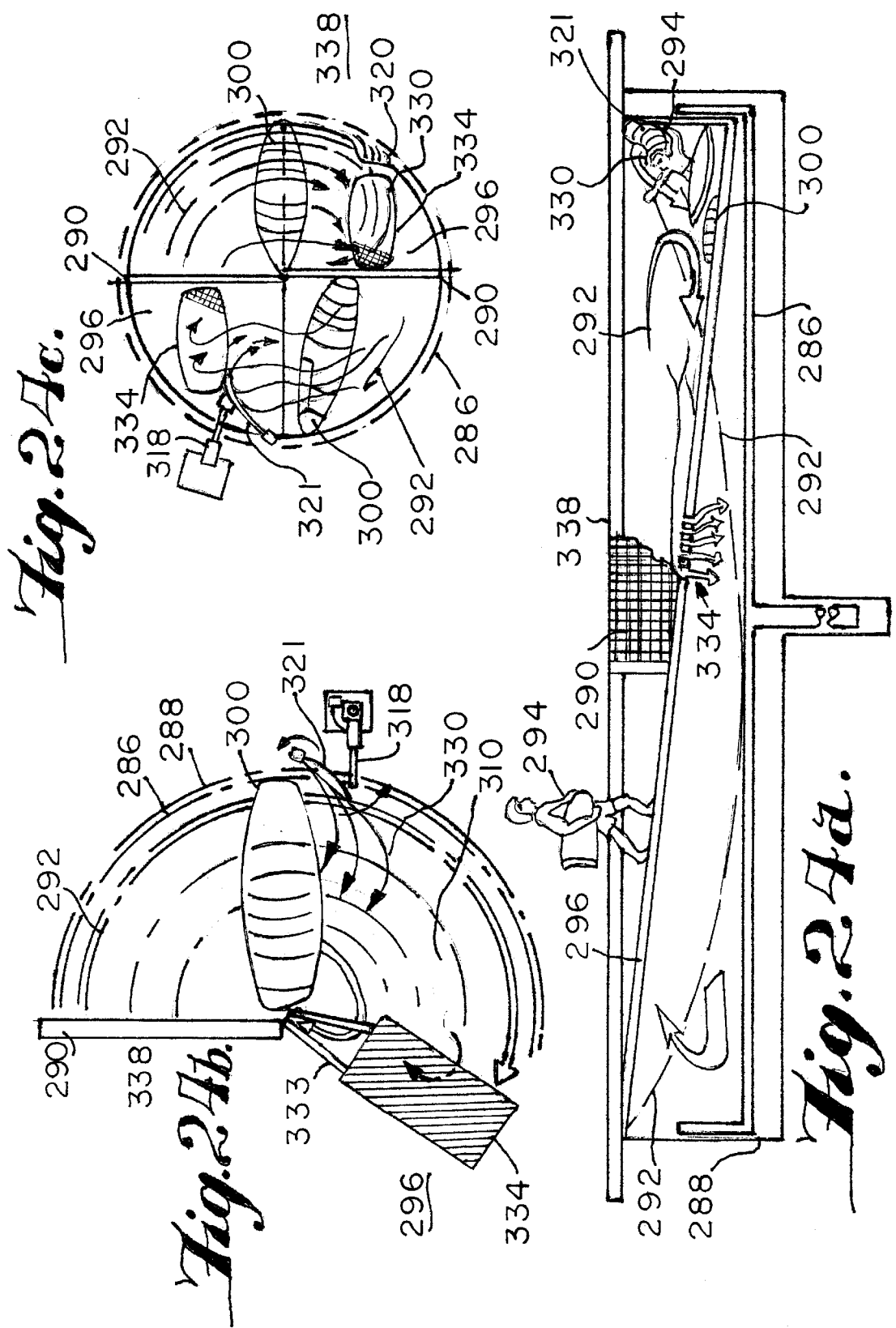

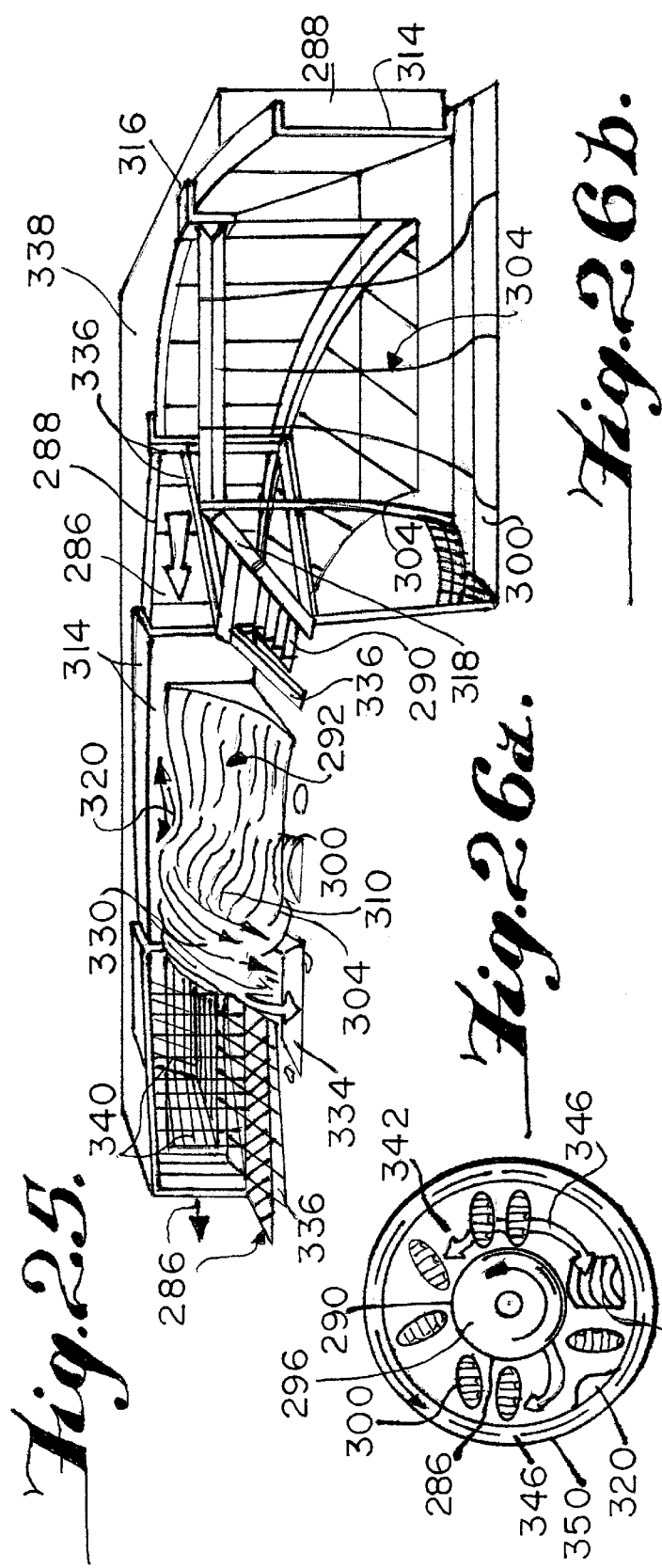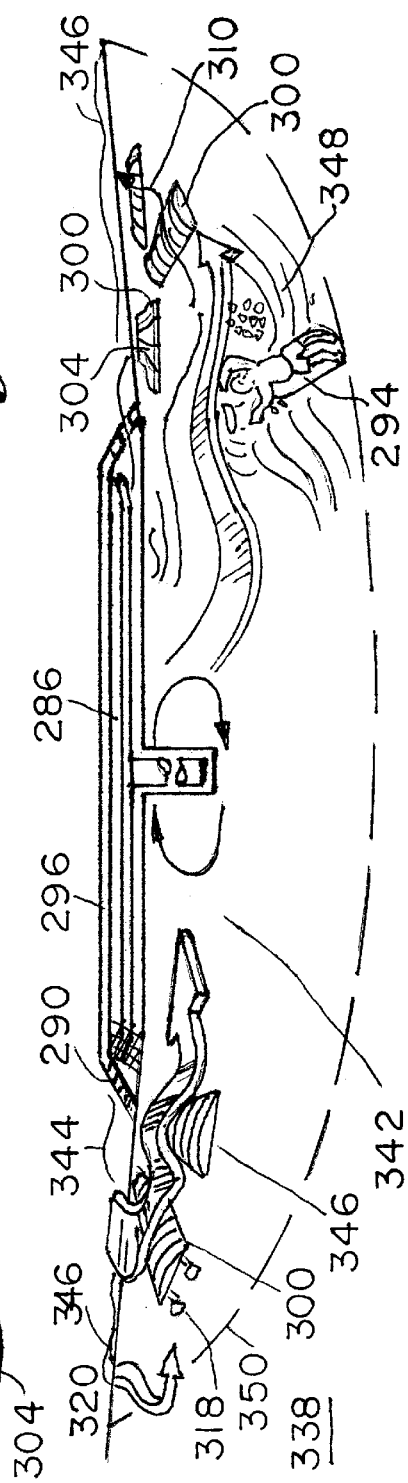

ROTATABLE WAVE-FORMING APPARATUS

CROSS REFERENCE TO RELATED APPLICATIONS

The present application is a continuation-in-part of U.S. patent application Ser. No. 08/944,401, filed Oct. 6, 1997, now U.S. Pat. No. 6,019,547 issued Feb. 1, 2000, which claims the benefit of U.S. application Ser. No. 60/028,002, filed Oct. 8, 1996, which are herein incorporated in their entireties by reference.

FIELD OF THE INVENTION

The present invention relates to a means for simulating natural surfable waves for recreation. More particularly, the present invention relates to a rotatable surfing wave simulator that can artificially produce surfable waves.

BACKGROUND OF THE INVENTION

At both the Waimea River and Snake River locations a natural river or river run flows across first and second natural formations, known as antidunes. Upon hitting the second natural antidune, the river flow jacks up into a natural surfable standing wave. Upon further research it has become apparent that, especially at the aforementioned mouth of the Waimea River where it flows into Waimea Bay, sand from either bank of the river deposits into the river flow and forms the antidunes. The antidunes are formed substantially in the shape of cambered aerofoils not unlike those found on a fixed and/or rotary heavier-than-air aircraft wings and their attendant attachments.

FIG. 1 shows a side-cutaway view of an antidune configuration as naturally occurs at a Waimea Bay natural surfable standing wave. As shown in FIG. 1, any number of antidunes may be formed along the river run at downstream locations from a first antidune. Surfable standing waves are created between the first antidune formation and a second antidune formation downstream of the first formation. Where the first antidune possesses less camber or convexity than the second formation, a surfable natural standing wave is created.

A problem that occurs at the Waimea Bay river mouth's surfable standing wave is the downstream collision of surfers riding thereon. A downstream collision is depicted in FIG. 1 at the region defined as "X" and is undesirable for safety reasons.

Many aquatic pool structures and systems have heretofore been invented and constructed for the purpose of creating surfable artificial waves: however, these structures and devices have not, to date, enabled the creation of a realistic simulated natural standing wave or a device which enables easy viewing for spectators.

U.S. Pat. Nos. 5,401,117; 5,393,170; 5,236,280; and 4,954,014 disclose wave forming devices. Devices are disclosed wherein a wave-shaping surface is used to form a flow of water into the shape of the wave-shaping surface. Water is then directed at great force toward the wave-shaping surface through nozzles at various velocities and the wave-shaped surfaces of the forced fluid flow can be ridden upon by surf riders. The forced fluid flow conforms to the contours of the slope of the wave-shaped surface. Such devices generally do not simulate natural surfable standing waves, as created upon rivers by antidune formations which have natural surfable standing wave formations that do not conform to their antidune wave forming means.

Simulated fluid tubular "barrels" created by prior devices may be injurious to surf riders and damaging to the device ridden by a surf rider. The combination of a surf rider being caught in the arcing flow of a moving fluid tubular section of a wave as created by the prior devices, and being propelled by gravity for the most part out of control and airborne in the arcing fluid flow, inevitably leads to a high-impact and inherently injurious collision with the hard surface of the wave-forming means.

It is desirable to provide a standing wave that simulates standing waves occurring in nature. It is also desirable to provide a standing wave for the amusement of surf riders, wherein the wave is formed on a flexible medium of sufficient flexibility to absorb the impact of a surfer rider spill or mishap thereon. It is also desirable to provide a standing wave for the amusement of surf riders, wherein the wave is formed on a flexible medium of sufficient transparency to permit multiple angle spectator viewing of surf riding action thereon.

It is desirable to provide a device that can form a safe arcing fluid tubular formation for surf riding wherein: the shape of the tubular formation is quickly and instantly variable; the fluid tubular formation is separate from the simulated natural standing wave forming means; and the wave forming means is of a design which avoids the launching of a surf rider from the tubular formation into a high-impact collision with the wave-forming device.

SUMMARY OF THE INVENTION

The present invention provides a device and method for forming a standing or traveling wave by utilizing a water-shaping aerofoil structure and a wave-forming structure. The present invention provides a standing wave that simulates standing waves occurring in nature. According to embodiments of the invention, the wave-forming structure may be flexible, transparent, or both. According to embodiments of the invention, the wave-forming structure may be a transparent wave-forming ramp comprising a material that is sufficiently transparent to allow spectator viewing from all angles.

The present invention provides a device for creating a circular simulated river run via centrifugal force and to further create upon said centrifugally created river run one or more simulated natural standing waves utilizing at least one cambered fluid deflecting aerofoil.

According to some embodiments of the invention, the wave-forming structure may be adjustable to a wave-forming position and to a flatter release position for terminating a ride on the simulated wave. According to some embodiments of the invention mechanical means are provided to cause quick and instantaneous changes to the shape or position of the wave-forming structure thus causing quick and instantaneous changes to the standing wave formed thereon.

According to embodiments of the present invention, a device is provided that can form a safe arcing fluid tubular formation for surf riding wherein: the shape of the tubular formation is quickly and instantly variable; the fluid tubular formation is separate from the simulated natural standing wave forming means; and the wave forming means is of a design that avoids the launching of a surf rider from the tubular formation into a high-impact collision with the wave-forming device.

The present invention provides a means for simulating a natural standing wave which is safe for surf riders to ride upon. According to embodiments of the present invention, a standing wave formation device is provided which obviates the problem of a downstream collision with another rider.

The present invention provides a means of simulating a natural standing wave using cambered aerofoil shaped structures and attachments as found on heavier-than-air aircraft, including but not limited to ailerons, flaps, spoilers, rudders, stabilizers, elevators, wing slots, split flaps, nacelles, slotted flaps, empennages, dual rudders, canard aerofoil configurations, strakes, flexible foils, butterfly tails and like or similar aerofoil devices.

According to embodiments of the invention, a simulated natural river is created utilizing a variable angle and/or length river simulation flume channel, an elevated water tower, and an adjustable penstock located on at least one side of the tower for the creation of a creeping (very slow) or non-creeping simulated river run, with the simulated river run encountering the aerofoils for the simulation of natural surfable standing waves thereon.

The present invention provides a means, mechanical or otherwise, for the quick and instant change of pitch, yaw, roll, angle of attack, or combination thereof, of the cambered aerofoil shaped structures, for the simulation of a constantly variable simulated natural standing wave thereon.

The present invention provides a means for producing a variable geometry of a cambered aerofoil-shaped structure quickly and instantly during a surf ride. The present invention provides a means for quickly and instantly changing cord, camber, wing span, aspect ratio, or a combination thereof, of an aerofoil shaped structure during a surf ride upon the wave created by the structure in combination with at least one other aerofoil-shaped structure to simulate a constantly variable simulated natural standing wave.

The present invention provides a separate means from the simulated standing wave forming means for the creation of elongated arcing tubular sheets of water to simulate tube formation as they occur naturally on surfable ocean waves, and to also provide a means of quickly and instantly changing the drop angle, curvature, length, width and other characteristics of the elongated arcing tubular fluid sheet of water by utilizing a wave enhancer system to be disclosed.

The present invention provides a simulated natural standing wave upon a flexible transparent plastic aerofoil flap or ramp with a water-whiteness rating of 92% or greater, for example, a flap or ramp comprising a polycarbonate plastic sheet.

According to embodiments of the present invention, mechanical means are used in conjunction with two or more cambered aerofoil-shaped structures for the safe, timely, and timed ejection of surf riders riding upon a simulated natural standing wave as created by the structures.

The present invention also provides a means of reducing the friction factor, otherwise known as drag coefficient, of a flow of water across a device according to the invention by utilizing a multiplicity of fluidly correct surface indentations and/or channels upon the components of the present invention.

The present invention also provides a device for creating a simulated standing wave for surfing action thereon, wherein the device may be quickly erected and dismantled, compact so as to conserve space, and readily capable of being utilized at permanent amusement parks or at a traveling amusement attraction.

According to embodiments of the invention, a flexible aerofoil structure may be utilized for the creation of a traveling surfing wave in a narrow channel for the recreational amusement of surf riders.

BRIEF DESCRIPTION OF THE INVENTION

The foregoing and other objects and features of the present invention will be more fully understood from the following detailed description of the present invention and the accompanying drawings wherein:

FIG. 1 is a side-cutaway view of a natural standing wave configuration;

FIG. 2A is a top view of a river-flow simulator according to embodiments of the invention, comprising an elevated water tower, river simulation flumes, adjustable penstock and other features;

FIG. 2B is a side view of the river-flow simulator as seen in FIG. 2A;

FIG. 3 depicts a side view of an adjustable penstock used according to embodiments of the present invention;

FIG. 4 shows a side-cutaway view of an alternative river simulation system utilizing a mechanical means to generate a centrifugally simulated natural standing wave according to embodiments of the present invention;

FIG. 5 shows a side view in partial phantom of a cambered fluid flow aerofoil configuration;

FIG. 6 shows a top plan view of a preferred embodiment of the present invention comprising a similar view to that disclosed in FIG. 5 with a means for quick and immediate rider ejection;

FIG. 7 shows a side-cutaway view of a device according to the present invention including a spectator viewing area underneath a simulated antidune configuration;

FIGS. 8A and 8B show a side-perspective view and a side-cutaway view, respectively, of a device according to embodiments of the present invention;

FIG. 8C shows a prototype ride upon a device according to embodiments of the present invention;

FIGS. 9A and 9B show a wave enhancer mechanism according to the present invention in side-cutaway and frontal view, respectively, with a flexible aerofoil flap configuration;

FIG. 9C shows a side-cutaway view of a wave enhancer mechanism with a transparent aerofoil configuration according to embodiments of the present invention;

FIG. 10 shows a close-up view of a wave enhancer mechanism according to embodiments of the present invention;

FIG. 11 depicts a perspective cutaway view of a wave enhancer mechanism according to embodiments of the present invention;

Figure 17:
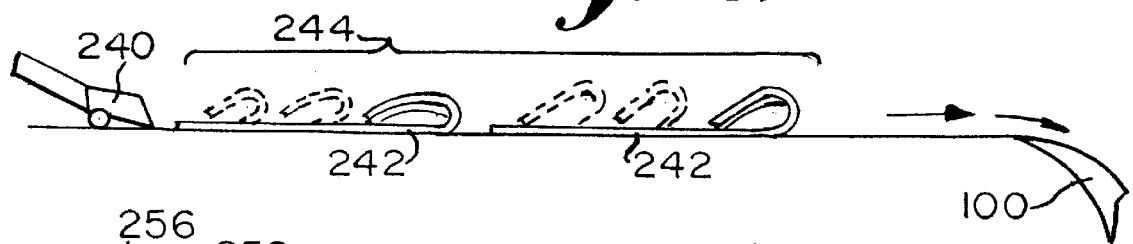
Figure 18A:
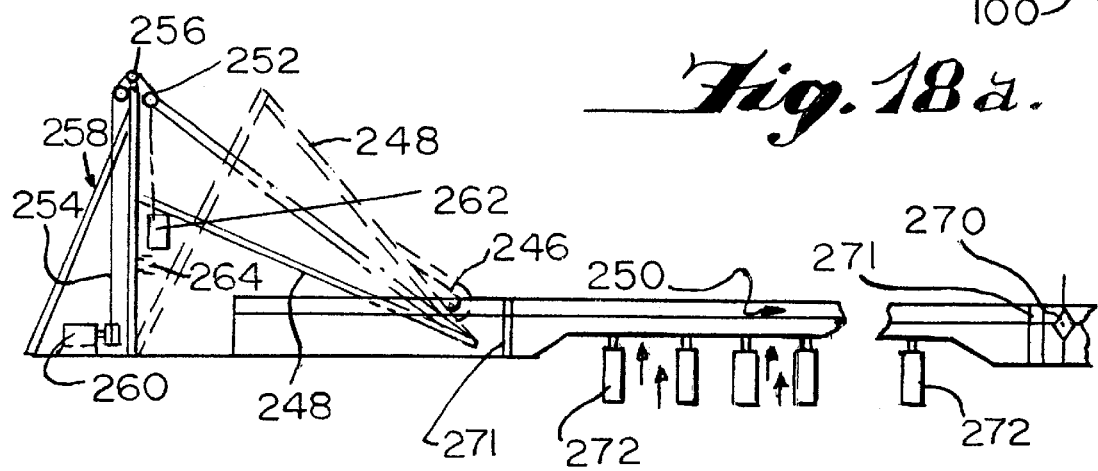
Figure 18B:
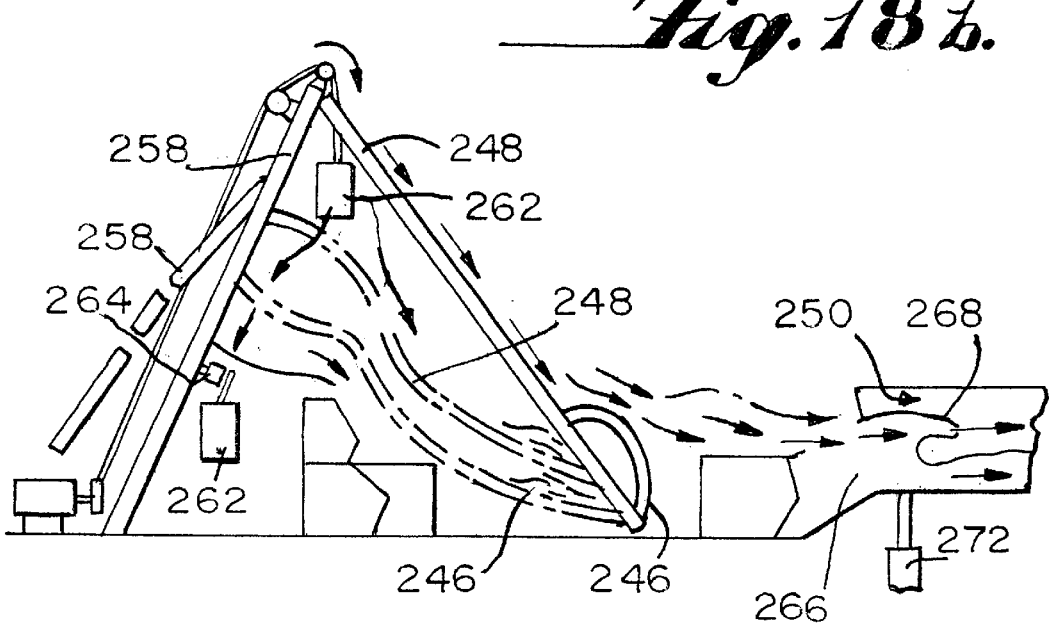
Figure 21:
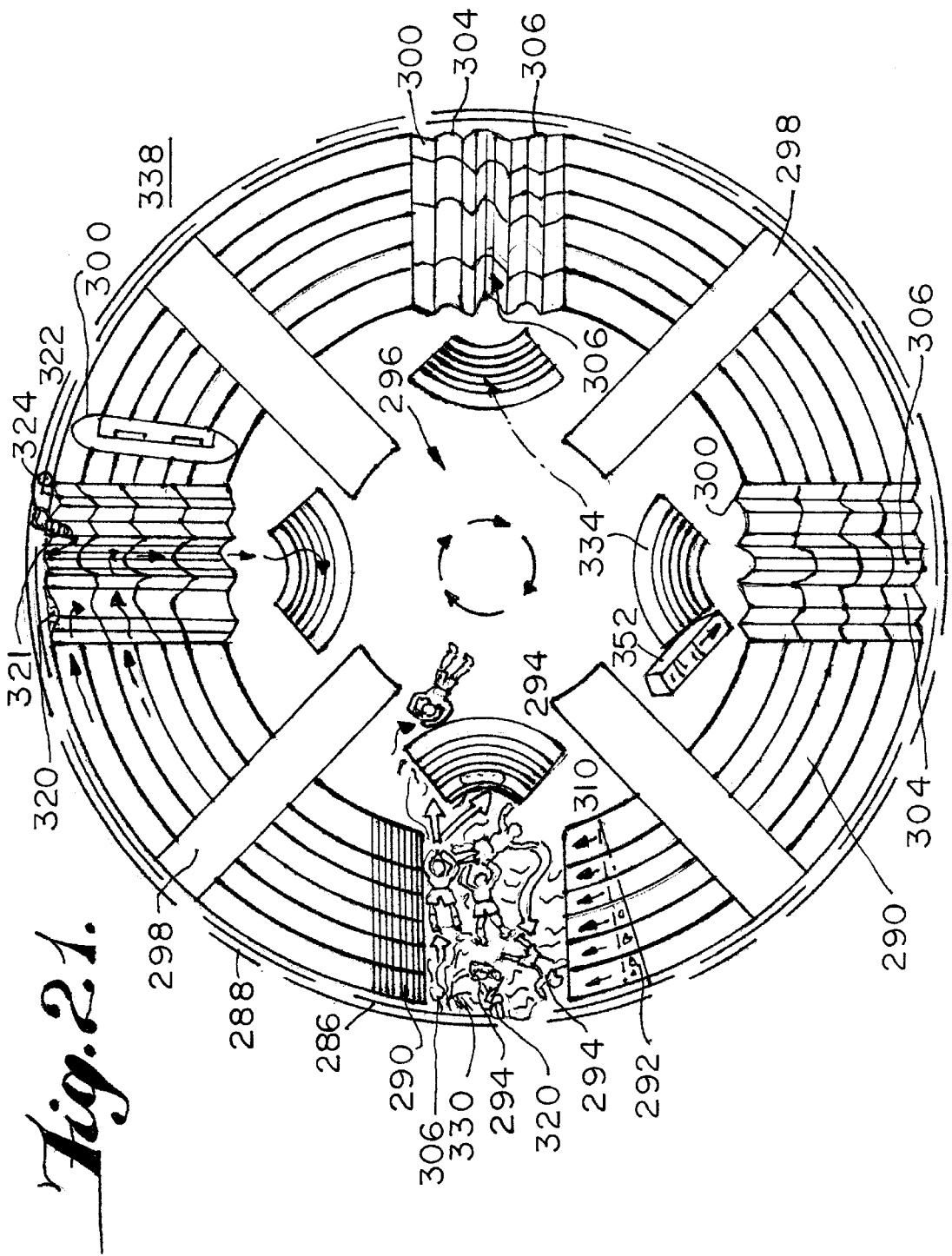

FIG. 17 discloses a side-view of a flexible variable aerofoil according to embodiments of the present invention;

FIG. 18A shows a side-cutaway view of a flexible aerofoil configuration for the creation of traveling surfing waves according to embodiments of the present invention;

FIG. 18B shows in sequence a side-cutaway view of the creation of a traveling surfing wave by a flexible aerofoil according to the embodiments of the present invention;

FIG. 19 shows a plan view of a forward path of a traveling surfing wave produced by a flexible aerofoil according to embodiments of the present invention;

FIG. 20 shows an aerofoil/conveyor belt combination according to embodiments of the present invention;

FIG. 21 is a top plan view of another embodiment of the present invention;

FIG. 22 is a perspective view in partial cutaway of an embodiment of the present invention similar to that shown in FIG. 21;

FIG. 23 is a side view in partial cutaway an embodiment of the present invention similar to that shown in FIG. 21;

FIG. 24a is a side view in partial cutaway of yet another embodiment of the present invention;

FIG. 24b is a partial top plan view of the embodiment shown in FIG. 24a;

FIG. 24c is a top plan view of a rotating wave simulator having a higher capacity than the embodiment shown in FIG. 24b;

FIG. 25 is a partial perspective view in partial cutaway of another embodiment of the present invention;

FIG. 26a is a top plan view of yet another embodiment of the present invention; and FIG. 26b is a side perspective view in partial cutaway of the embodiment shown in FIG. 26a.

DETAILED DESCRIPTION OF PREFERRED EMBODIMENTS

Herein, aeronautical terms well-known to those skilled in the art shall be used in the description of the present invention. Additionally, terms utilized in the fields of fluid mechanics, fluvial processes, nautical engineering, the sport of surfing, and like or similar fields, are also used herein to describe the present invention. Like reference numerals in different figures represent the same component.

FIGS. 2A and 2B show a preferred system according to embodiments of the present invention for the simulation of a creeping and non-creeping river run for use with cambered aerofoil-shaped structures and/or flexible transparent aerofoil flaps for the formation of simulated natural standing waves thereon. An elevated water tower 30 is positioned and erected in a suitable and spacious area. The tower 30 may preferably be up to about 20% higher than the simulated natural standing wave to be formed. A water containment tank or reservoir 32 of water tower 30 is preferably transparent at the upper rim for ride operator visual regulation of the water level in the tower. Additionally, the water tower may be of any shape, size, dimensions and construction so long as an elevated water tower is provided. A pump system (not shown) may be utilized to transport water from a reservoir to the water tower. The pump system may include, but is not limited to, centrifugal, split-casing, vacuum, submersible, suction, and vertical turbine-type pumps. Archimedean screw-type water moving systems are particularly preferred at low heads for the simulation of a river run according to embodiments of the invention.

One or more river simulation flumes 34 are provided connected to the supply of water in the water containment tank or reservoir 32 at the top of the tower. The flumes 34 may be fabricated of any number of suitable materials and are hingeably attached to one or more sides of the water tower. The flumes are preferably made of a multiplicity of telescopically interconnected sections 36, as shown in the drawings, to allow for a multiplicity of angularizations and/or lengths of the river simulation flume, enabling a wide variety of gravity-induced simulated river runs. Telescoping of a telescopic river simulation flume may preferably be controlled by mechanical means (not shown), including, but not limited to, motor, spur gear and gear rack systems, pulleys, wire rope and motor systems, chain or belt drive systems, hydraulic and/or pneumatic systems or like means of telescoping and/or shortening a telescopic river simulation flume. Flexible gaskets (not shown) may be installed at necessary points upon each flume for the positive containment of a simulated river flow.

Further disclosed in conjunction with the river simulation flume is a hinged flume end 38, as shown in the Figures. The flume end may be rotatably supported by wheels, rollers or like rotatable support means. This configuration allows for a fluidly non-turbulent transition of the simulated river. The inner surface of the flume end and the inner surface of the river simulation flume are optimally formed with dimples 40 therein. The dimples 40 are provided on the surfaces to reduce the friction between the simulated river run and the fluid contact surfaces of a device of the present invention. Similar dimples have been used successfully for many years on golf balls, military aircraft, surf craft and wind surfing craft for reducing the friction factor, otherwise known as drag coefficient, between a fluid flow, either gaseous or liquid, and a solid surface. As seen in the Figures, a multiplicity of dimples 40 may be provided and may range in length and/or width from about one inch to about six inches and may preferably have a maximum depth of about ¼ inch. A multiplicity of channels 42 may be provided for similar friction factor reduction. Channels 42 may be used which normally possess a maximum height and/or width of about ½ inch and may be used alone or in conjunction with dimples 40. As seen in the Figures, not only dimples 40 but also channels 42 may vary in length, width, cross-section and curvature from one to the other, wherein the variations not only enhance drag coefficient reduction and reducing fluid shear at the boundary but also positively modify the simulated river and/or river run and/or simulated natural standing wave.

Referring now to FIG. 3, a variable penstock 44 is installed upon the uppermost rim 46 of the water tower 30. As shown in the Figure, a flap 48, which may comprise steel, hard rubber, thermoplastics or the like, is hingeably connected to an upper support 50 such as a steel tube or the like. As the flap 48 is pivoted outward by well-known means (not shown), including but not limited to linear jacks, chain, belt or pulley drives, the water enclosed in the water tower reservoir 32 is allowed to run down river simulation flume 34, being driven downward thereon by the force of gravity.

The variable penstock 44 may be controlled via manually manipulated means, for example, chains and/or elastomeric cords of various lengths may be installed by hand to both outermost lower tips of the flap 48 and then connected by well-known means to the water tower 30, thereby allowing for a constant-character simulated river run from the reservoir tank 32, down variable angle simulated river flumes 34 to form simulated rivers in an area 52 of the simulator for the simulation of a natural standing wave in area 52.

The angles of the river simulation flumes 34 and/or the outward projections of flaps 48 may be controlled and regulated within specific parameters so that the simulated river runs represented in the Figures by arrows on and extending from flumes 34, may run no faster and/or deeper than a speed and/or depth represented by a Reynolds number of 490 or less. It will be recognized by those skilled in the art that rivers, natural and simulated, that run at a speed represented by a Reynolds number of 500 or greater tend to be turbulent, whereas a laminar (smooth) river run is the preferred river run for natural standing wave simulation with regards to the present invention. It will be further recognized by those skilled in the art that the Reynolds number for open channel flow is derived from the formula Vd/v, where v is the kinematic viscosity u/y, in which u is the dynamic viscosity and y is the density of the fluid, V is the mean velocity and d is depth.

It will also be recognized by those skilled in the art that laminar flow is common only in cases in which the flow channel is relatively small, the fluid is moving slowly, and its viscosity is relatively high. To this end, the length of each variable penstock 44 and its attendant flap 48 is preferably about eight feet or less, the uppermost width of telescopic flume 34 is also about eight feet or less, and the maximum downwardly disposed, fluid discharging end 38 of the flume is preferably about twenty feet or less in width. By keeping the simulated river run contained to such a relatively small channel, as well as keeping simulated river speed and depth within the aforementioned Reynolds number limits, and by optionally utilizing friction factor-reducing dimples 40 and/ or channels 42, a constantly laminar simulated river run may be consistently maintained.

According to embodiments of the present invention, the simulated river run may have a water depth of about 3 inches or greater, preferably about 4 inches or greater. Due to economics and weight reasons, a preferred water depth of the simulated river run may be from about 6 to about 30 inches.

A hydraulic linear jack may be implemented to quickly and instantly lift a side of the upper water containment tank 32 of the water tower 30, with the side opposite the lifted side being hingeably connected to the main body of the water tower. This configuration will allow for a quick and instant surge of water down a river simulation flume when the water containment tank 32 is lifted in the aforementioned manner, for an exciting and unexpected change to a simulated standing wave created at area 52.

A multiplicity of water towers 30, river simulation flumes 34, variable penstocks 44 and areas 52 may be employed to create a configuration for a high-capacity surfing amusement attraction according to embodiments of the present invention.

The water tower 30 may be of any shape, with the shape chosen determining the resultant number of wave riding areas 52, wherein the areas 52 are areas in which simulated natural standing wave formation occurs. For example, an octagonally-shaped tower may have a flume extending downwardly from each side of the tower 30 to eight wave riding areas, whereas a pentagonal-shaped tower may have five wave riding areas, and so on. According to some embodiments of the present invention a configuration is provided wherein a side of the tower is of sufficient length such that two or more penstocks and flumes may be affixed to any one side of the tower for an increased capacity surfing amusement ride according to embodiments of the present invention.

The water tower may be made of sufficiently strong and lightweight materials so as to be not only transportable but also quickly set-up and dismantled. A number of workers may set up the tower on the ground and, hoist up the tower. Other means, such as a mechanical winch or the like, may be used to this end. A lightweight, strong and compact river simulation flume may then be attached to the tower as shown, for example, in FIGS. 2A and 2B. Such a system, in conjunction with wave-forming means to be disclosed and disposed in wave riding areas 52, may be easily trucked from one location to another, allowing for a surfing amusement device according to embodiments of the present invention to be available at traveling carnivals, fairs, exposes, trade shows and the like, or for the manufacture of small and compact backyard units.

As seen in FIG. 5, two aerofoil wing-shaped structures 54, 56 are disposed in an area 52 for the formation of a surfable standing wave 58. The simulated river run created by the river simulation system of FIGS. 2A, 2B and 3, or by the system of FIG. 4 discussed below, flows over a first upstream aerofoil 54. The upstream aerofoil 54 preferably has less camber and/or convexity than a second downstream aerofoil 56. A flow of water is parted as it flows over the aerofoil 54. The top of the aerofoil 54 produces a negative pressure area with a "wave", of sorts, being formed in front of and atop the cambered surface of the aerofoil due to the parting of the fluid flow. Where a cambered aerofoil is positioned upstream of a second cambered and fluidly correct or tuned aerofoil, the flow is shaped and a first "wave" is formed by and flows over the first aerofoil and, due to the negative pressure created thereon, over the trailing edge of the aerofoil 54. When the resulting wave then encounters the leading cambered edge of the second, downstream aerofoil 56 the wave jacks up into a surfable standing wave configuration. This phenomena is in keeping not only with the laws of hydrodynamics and/or aerodynamics, wherein the pressure differential between upper and lower aerofoil surfaces creates lift in the fluid medium upon the upper surface of the aerofoil, but also in keeping with the observed laws of light and sound waves.

To wit, if a sound/light wave encounters a boundary in a medium, part or all of the light/sound wave will be reflected and the wave is inverted as a result of the reflection. In like fashion, the first unsurfable standing wave formed upon the first upstream aerofoil 54 becomes, in a matter of speaking, "inverted" as it flows over the trailing edge of the first upstream aerofoil 54. As the "inverted" wave encounters the second downstream aerofoil 56, the second downstream aerofoil 56 is preferably more cambered than the first upstream aerofoil 54. The second, downstream aerofoil 56 also shapes a flow of water and forms a wave upon its cambered surface when disposed in a fluid flow. When the waves produced by the two aerofoils are superimposed, their energies are either added together or canceled out. With respect to the present invention, provided the upstream and downstream aerofoils 54, 56 are of fluidly correct shape and their angles of attack, pitch, yaw, roll, etc., are synchronous, the energies of the initial albeit unrideable standing wave formed on the first upstream aerofoil and the wave formed by the secondary downstream aerofoil are added together in front of and atop the second airfoil 56, thereby creating a surfable standing wave 58 which simulates that formed in natural river runs.

Natural, surfable standing waves are formed upon rivers and streams by a form of bed roughness and/or alluvial channel formation(s) known as antidunes, with the profiles and cross-sections of the antidunes resembling that of the top surface of an aerofoil or hydrofoil. Herein, the flow-shaping and wave-forming devices used according to the present invention will be referred to as aerofoils. Many thousands of variations in thickness and in contour of aerofoils have been tested and the changes in lift and drag with angle of attack recorded. The variations have provided design data for aerofoils, airplane wings, propeller blades, helicopter rotor blades, hydrofoils, etc., and that any, all, or a combination of said aerofoil parameters may be used for a widely variant spectrum of standing wave formations according to the present invention, so long as a convex cambered combination of fluidly correct aerofoils is provided.

A preferred combination is one aerofoil 54 upstream of a second aerofoil 56, with the surfable standing wave 58 being formed in front of and/or atop of the second aerofoil 56 as a result of the physics inherent in aerofoil combination as previously disclosed and best shown in FIG. 5.

Referring now to FIG. 4, another method of forming a flow of water is provided. A body of water may be disposed in a circular pool 60. The pool 60 may be centrally mounted on a rotatable shaft 62 and supported and rotated by a motor system (not shown) so as to generate an inclined surface of the body of water and create a circular simulated natural river run therein. Support means, a motor system and other adaptable features which may be used according to the present invention are disclosed in U.S. Pat. No. 5,205,670, which is incorporated herein by reference in its entirety. The greater the radius of the pool 60 the farther from the center of same is the simulated river run created, as well as the greater the centrifugal force driving the river run around with the pool. Therefore, it is preferable to utilize a pool, or even a circular channel or flume, wherein the outer walls of the circular pool are at as great a distance from the center as is economically feasible to take best advantage of the centrifugal force created by the aforementioned system. A smaller pool diameter may instead be employed, for example, to make a "kiddie size" model, which may fit in a small backyard.

As shown in FIG. 4, armatures 64 may be affixed to a raised stationary deck 66 as shown. Aerofoils 68 may then be in turn affixed to the lowermost portion of each armature 64, which is for the most part immersed in the fluid body disposed within the pool 60. The aerofoils 68 may be used to form a simulated natural standing wave 70 in the circular simulated river run as created therein. For safety reasons a surf rider 72 within the pool 60 may have his surf craft 74 attached to the stationary deck 66 via a tether 76 of sufficient holding strength not to break. The tether restrains movement in the direction of pool rotation of a surf craft and rider supported on the inclined surface. Torso straps 78, fabricated of sufficiently strong yet comfortable material, may be affixed as shown to the surf craft 74 to positively retain a rider 72 upon the surf craft 74 within the rotary simulated river run as created by the system. A vertically-disposed rudder 80, attached to the stationary deck 66 via an armature 82 may be disposed as shown for additional positive manipulation of a simulated river run to create exciting and interesting variations to a simulated natural surfable standing wave 70, including but not limited to tubular formations, white water formations and like or similar fluid formations within the circular simulated river run according to the present invention. The rudder 80 and the aerofoils 68 may be moved quickly and instantly via well-known aerofoil movement means (described above), to create an exciting and unpredictable surfing experience for a rider 72 surfing a simulated natural standing wave created in the rotating pool.

Any number of riders may be accommodated within the pool 60. The riders may be free of the constraints of tethers and may floatably stand or be prone upon respective surf crafts or other floating devices. In this manner a high-capacity simulated river run, replete with a simulated natural standing wave 70 may be provided which allows riders to circularly ride around with the centrifugally created river run and/or upon the simulated natural standing wave 70 created by the aerofoils.

Aerofoils may also be affixed to the bottom of the circular pool 60 which may create one or more circularly traveling standing waves for rider enjoyment. A stationary circular platform may be positioned centrally within the rotating pool and two or more stairways or rampways may be provided affixed between an inner pool platform and a raised stationary deck for both rider access and inner platform securement. The circular pool may be installed within a larger fluid-containing pool wherein fluid contained in the larger, outer pool acts as a sort of bearing and support system for the rotation of the inner pool therein. Dimples and/or channels for reducing the drag coefficient may also be employed within and upon surfaces of the rotating pool and wave-forming accessories according to embodiments of the invention.

Many variations in design may be realized to create many desired variations of surfable standing waves by utilizing a rotating pool to create a centrifugal wave flow in a volume of water. As seen best in FIGS. 21, 22, 23, and 25 a rotating pool, flume or channel 286 may be centrally and rotatably mounted in a larger basin 288. Support structures, drive means and other adaptable features as disclosed in U.S. Pat. No. 5,205,670 may also be used, which is incorporated herein by reference in its entirety. The basin 288 may be made of any number of suitable materials, such as fiberglass or concrete, and preferably has a volume of water 289 disposed therein to support the centrifugal standing wave- and/or river-generating pool 286 therein. The horizontally disposed circumference of the basin 288 may be canted downward (not shown) to direct water back into the pool 286 which is either swirled out of the centrifugal flow or spray from a banking turn of a surf rider surfing within the wave machine. Additionally, an outer deck 338, which is constructed of any number of well-known materials, is disposed as shown. The rotating centrifugal wave generating pool 286 is preferably fabricated of lightweight strong materials such as fiberglass or stainless steel, and may have surface modifications on the inward, flow-generating surface of the pool to aid in the flow generating function of the pool 286, for example, aerofoil structures or shaped vanes may be attached or conformed thereon.

Due to the sheer mass of water that the invention generally requires to make the desired wave formations, standard support systems alone may not be adequate to maintain the desired low-friction rotation and/or engineering integrity of the system at high-velocity r.p.m. Therefore, the rotating pool 286 preferably acts as a displacement vessel within a fluid volume 289 disposed within the basin 288. As the centrifugal wave flow generating pool 286 is rotated at speed within the fluid volume disposed in the basin 288, the fluid volume acts not only as a support for the weight of the fluid volume within the pool 286 but also as an extremely low friction fluid bearing for the rotation of pool 286. A central shaft and bearing assembly may also be used to help stabilize the rotation of the pool 286. Standard rotatable support means such as tires, casters and hubs may be used in conjunction with the support/bearing function provided by the basin 288, or by themselves for support of a pool 286 in low fluid volume units of the present invention.

A safety grating 290 may be utilized to allow the centrifugally created standing wave flow 292 to be safely harnessed for the creation of standing waves according to the present invention. The grating 290 separates the spinning centrifugal pool 286 from contact with the surf riders 294 for greater safety than if the spinning pool 286 were exposed to contact with the ride patrons. The grating 290 may be fabricated of any of a number of well-known materials, such as fiber reinforced plastic or stainless steel, or other suitable materials, and may be padded as deemed desirable. The safety grating 290 is engineered and fabricated in such a manner so as to allow for the high torsion and shear stresses imposed upon it by the high velocity/high volume centrifugal flow of the present invention without structural and/or materials failure of the grating 290. Additionally, the safety grating 290 is preferably fabricated of hydrodynamically low-drag members so that the centrifugal flow may penetrate therethrough with minimal turbulence created within the flow. Elliptically shaped members which are essentially formed into spaced circles of gradually decreasing circumference in the horizontally disposed area of the grating 290, as shown, and members of similar cross section and construction which are similarly formed into spaced circles of the same circumference for the grating 290 disposed in the vertical portion of same is a preferred version of a safety grating of the present invention. The portions of the safety grating 290 which tie in and space the circular members of the grate and are perpendicular to the centrifugal flow 292 are preferably kept to a minimum as they tend to create turbulent flow within the normally laminar standing wave flow as created by the present invention. The grating 290 preferably conforms closely to the general outline of the pool 286, but does not interfere with the free rotation of same.

A central platform 296 may be firmly attached to the grating 290, as shown in the Figures, with the platform 296 inherently formed of the same materials and construct as the grating 290. The platform 296 is preferably supported in such a manner to allow for a high number of persons to be supported thereon without structural failure of the platform 296 or the attached grating 290. For example, stainless steel, aluminum members, or other suitable structural members may be welded or otherwise fabricated and fitted to be the support structure of the safety grating 290 as well as the central platform 296, with said platform/grating support members (not shown) being attached to the outer upper vertically disposed and/or the outer horizontal surface of the basin 290.

As shown in the Figures, the grating 290 overlaps the upper rim of the basin 288 and is attached by well-known means to either the vertical inner surface or, as shown, the outer horizontal surface of the outer deck 338. Walkways 298 may be installed between the outer rim of the basin 288 or the outer deck 338 and the central platform 296 as shown to allow ride patrons easy access to the standing waves being formed within the present invention. The walkways 298 and the inner platform 296 are preferably so joined or fabricated so as to be essentially the same component of the present invention, yet may also be attached in such a manner that they may be easily removed for maintenance or repair of the invention.

In one embodiment of the present invention, the vertically disposed wall of the centrifugal wave-generating pool 286 may be made of a substantially lower height than the corresponding vertical basin wall 288. In fact, a vertical wall of the rotating pool 286 may be made only a few inches high and, if the rotations per minute of said pool is of a high rate, for example, between 45 and 500 r.p.m., the desired centrifugal flow for forming surfing wave formations according to the present invention may be realized. If the wall height of the pool 286 is adequately low the vertical portion of the grating 290 may be deemed unnecessary and the horizontal portion of the grating 290, which adjoins the outer circumference of the stationary inner platform 296 as shown in the Figures, may then adjoin the generally vertically disposed wall of the basin 288, with the upper rim of the pool 286 disposed under the grating 290 with a relatively close tolerance to the lower surface of the grating 290. This embodiment of the invention makes the materials requirements of the present invention less than if the vertical portion of the safety grating 290 was also implemented, thereby making the manufacturing cost of same less and thereby the corresponding cost lower for the purchaser of a unit of the present invention. A substantially clear basin wall 308 may then be implemented, as shown best in cutaway in FIG. 23, so that aquatic amusement park patrons may watch surfing action taking place within the wave simulator without undue line-of-sight blockage from the vertical portion of the grating 290. For clarity, the vertical portion of the grating 290 has been left in the Figures, but it will be recognized by those skilled in the art that the aforementioned system of a low-height rotating pool 286, horizontally disposed safety grating 290 overlaying the pool 286, and a clear support basin wall 308 may be easily realized according to the present invention. Of course, the vertical wall of the centrifugal flow generator pool 286 may be made of any height and the vertical portion of the safety grating 290 implemented as shown in the Figures and as previously disclosed.

As seen in the Figures, a recreational standing wave-forming system comprising upstream aerofoils 300 and downstream aerofoil ramps 304 is provided to harness the centrifugally created circular standing wave flow 292 to create a preferred recreational standing wave formation of the present invention. As seen in the Figures, as the centrifugal flow 292 flows up and around as the pool 286 is rotated, the circular standing wave flow 292 penetrates the grating 290 and, as it encounters the aerofoil 300 disposed within the flow, flows up and over the leading edge of the upstream flow-shaping aerofoil and doubles up in accordance with the law of superposition on either a downstream ramp 304 or an additional, downstream aerofoil 300 (not shown), forming a surfable standing wave thereon. The invention successfully simulates the natural surfable standing wave as formed in alluvial channels by the aerofoil-like antidune formations that occur therein, the antidunes being formed as a bottom deposition of the riffle-pool sequence. The antidune structures are erosional depositions and are similar in form to aerofoils as found on heavier-than-air aircraft. This system of utilizing aerofoils and aerofoil flaps within a centrifugal standing wave flow creates a surfing wave of an extremely high-quality and of an exotic and desirable hybrid nature heretofore unseen either in nature or in prior artificial surfing wave generators. The centrifugal flow 292 is, in and of itself, a type of surfable standing wave and, as it encounters the aerofoil 300 and downstream ramp 304, it forms another type of standing wave. To wit, the flow of the centrifugally created standing wave 292 of the present invention flows circumferentially, with the trough of the circular standing wave lying closer to the center of rotation than the crest, the crest of the circular wave being disposed closer to the circumference of the rotating pool 286. Now, as the circular, centrifugally-created standing wave 292 encounters the aforementioned aerofoil 300 and downstream aerofoil ramp flap 304, the wave 292 forms an additional standing wave 310 thereon wherein the flow of the standing wave is in a traditional direction, that is, from trough to crest. However, the circular standing wave 292 does not dissipate or lose its shape or velocity to any great degree in the creation of the aforementioned traditional, trough-to-crest flow standing wave 310, and the centrifugal circular standing wave 292 coexists with said traditional standing wave at the point of incidence. This gives the surf rider 294 a binary wave form of multiple curvature and complex fluid flow dynamic character upon which to perform maneuvers.

The traditional standing wave 310, being formed in a radial direction within the present invention and substantially perpendicular to the circular standing wave flow 292, not only gives the surf rider 294 a wave form to perform surfing maneuvers upon but also performs the vital function of preventing the surfer from being swept around with the centrifugal flow. In this manner the traditional surfable standing wave 310 keeps the surfer in the same relative radial position within the simulator, which allows him to gain the necessary position within the centrifugal flow to successfully ride the circular standing wave created by the present invention. As shown in FIG. 21, the surf rider 294 may ride upon the circular standing wave 292 and surf upstream thereon, progressing forward upon the centrifugal standing wave in a pumping manner not unlike that utilized by surfers upon ocean-borne traveling waves. The surf rider 294 may, at his discretion, "cut back" in the centrifugal flow back to the radially disposed traditional standing wave 310, upon which he may also perform surfing maneuvers.

The compound surfing wave formed by the present invention gives the surf rider a new and exciting surfing experience. Additionally, the complex character binary wave form described is of extremely high quality for performing surfing maneuvers thereon, as the smooth and easily navigable laminar flow of the surfing standing wave as created by the present invention is strongly stabilized by centrifugal forces. A fluid particle from an outer layer of the centrifugal wave flow opposes being moved inwards because the centrifugal force on it is greater than on particles nearer the axis of rotation. At the same time, its outward movement is resisted by the higher centrifugal force on particles it would have to replace. As a result, the transition to turbulent flow in the wave of the present invention takes place at extremely high Reynolds numbers, so a high-quality, high-velocity, laminar, multiple curvature and complex character surfable standing wave may be successfully realized by the present invention.

The present invention is also more economical to produce and operate than other recreational wave-generating means due to the fact that the system requires less power to produce surfable standing waves because of the low-friction nature of the centrifugal wave generator. Also, once the initial spin-up sequence of the pool 286 has been engaged and the system is rotating at operational speed, the power requirements become significantly reduced due to the physics of the system, i.e., a body in motion tends to stay in motion, so the pool requires less power to keep rotating. These factors result in a high-quality recreational standing surfing wave machine which may be powered at a lower cost than the prior art. For safety of the ride patrons, the wave flow of the present invention may be stopped immediately by disengaging and/or stopping the driving means. The driving means normally comprises a friction drive wheel and motor assembly 312, as seen in FIG. 22. A braking device (not shown) may also be employed to slow or stop the wave flow. The invention also provides for varying wave types within the same recreational wave generating system so that not only complete surfing novices but also seasoned surfers can enjoy waves of varying intensity and magnitude as formed within the same wave simulator machine of the present invention. The invention realizes this object by varying the r.p.m. of the pool 286 and/or the volume of the pool 286, which may create small low-velocity "fun" standing waves at low rotations/volume for the amusement of novice surf riders, and larger, more intense and higher-velocity complex wave formations at higher rotations/volumes. As will become apparent, the modular nature of the wave-forming aerofoils and aerofoil flap ramps add to the ability of the present invention to accommodate riders of varying skill levels within the same wave machine. The r.p.m. of the centrifugal flow generating pool 286 may also be varied during a surfer's ride to create a variable velocity/intensity complex character standing wave during a surfer's wave ride within the invention.

The support basin 288, rotating centrifugal wave generating pool 286, and the platforms 296 and gratings 290 may be formed in such a manner so as to create multiple concentric circles of increasing diameter (not shown), with standing waves being formed in each succeeding concentric circle of the invention. Walkways 298 may be utilized to provide access to each concentric circle wherein surfable standing waves of complex character are formed. A higher-capacity version of the present invention may be realized in this manner.

Referring to the nature of the wave-shaping and wave-forming means of the present invention, any and all of the wave-shaping and wave-forming methods of the invention described and illustrated in U.S. patent application Ser. No. 08/944,401 may be utilized within the centrifugal wave generating flows of the present invention. A preferred combination is an upstream aerofoil 300 and a downstream wave-forming aerofoil flap ramp 304 or a secondary downstream wave-forming aerofoil structure. As shown in the Figures, and as described in the parent application, the aerofoil(s)300 and the aerofoil flap ramp 304 may be made from the same integral sheet of material, such as fiberglass or polycarbonate, or the wave-shaping aerofoil 300 and/or the wave-forming ramp 304 may be fabricated separately. The downstream wave-forming ramp 304 may be made sufficiently clear to enable spectator viewing from underneath the wave-forming aerofoil flap 304, as shown in FIG. 22. The aerofoils 300 and/or the aerofoil flaps 304 may be made of sufficiently lightweight and relatively inexpensive materials, such as fiberglass or clear polycarbonate plastic, so that they may be easily interchangeable within the wave simulator of the present invention. Many different types of aerofoils 300, aerofoil flaps 304, or combinations thereof, may be available and stored away from the wave simulator, each preferably different from the other in relation to chord, camber, wingspan, aspect ratio, attendant aerofoil attachments, elasticity, flexion, clarity, and like or similar changeable aerofoil characteristics. As deemed desirable by the ride owner or operator, the stored aerofoils 300 and/or flap ramps 304 may be interchanged with the aerofoils or ramps that are already affixed within the simulator. Such a modular standing wave-forming system has several advantages over the prior art. First, an amusement park owner that purchases a unit of the present invention need only purchase the newest model(s) of modular aerofoils 300 or aerofoil flaps 304 in order to provide park patrons with a different surfing experience from the waves as created by last season's foil/ramp models of the invention, as opposed to purchasing an entire new and costly aquatic ride with which to entice repeat visitors to his or her aquatic amusement waterpark. Second, the movable nature of the aerofoil wave-forming means of the invention makes the design and engineering of the aerofoils 300 and/or ramp flaps 304 more economically feasible. To wit, when the variable r.p.m. grating size and cross-section, variable flow velocity and magnitude, etc., are taken into account with regards to the fluid flow dynamic engineering of the wave-shaping and wave-forming components of the present invention, the engineering required to design perfectly tuned aerofoils 300 and/or ramps 304 for precise recreational standing wave formation may become very costly, and different wave-shaping and/or wave-forming components of the present invention may be engineered for each type of centrifugal wave flow field the invention is capable of generating. The same flawless and laminar fluid flow dynamics engineering and design that goes into fabricating an expensive and precise military aircraft's aerofoils and aerofoil control surfaces are not only desirable but are preferred for the proper wave-forming operation of the aerofoil and flap structures of the present invention.

However, if a multiplicity of positioning apertures (not shown) are provided for variable position mounting of the aerofoils 300 and/or the ramps 304, these wave-forming and/or wave-shaping members may be easily positioned and repositioned until the desired wave formation is created for each unique recreational application of the present invention, thereby negating the need for overly expensive aerofoil fluid dynamics design and engineering. For example, dense foam spacers of varying height and/or cross section, or other viable spacing means (not shown) may also be placed under a positioned aerofoil 300 to change pitch, roll or angle of incidence of the aerofoils 300 prior to the bolting down thereof at a specified yaw angle. To better facilitate such variable positioning the aerofoils 300 and/or ramps 304 may be fabricated of sufficiently flexible and repositionable material, such as high-density, closed-cell foam materials. As shown in FIG. 25, sliding brackets 316, made of tubular steel or other suitable material, may be used to vary the angle, flexion or tension of a flexible aerofoil flap ramp 304. Mechanical means, such as pneumatic or hydraulic jacks 318, may also be used to vary the pitch, yaw, roll, angle of incidence, angle of attack, or combination thereof, of either the wave-shaping or downstream wave-forming aerofoil 300, or a downstream aerofoil flap 304.

Means to install the aerofoils 300 and/or aerofoil flaps 304 within the wave machine may include mounting apertures provided upon the inner deck and/or the grating 290 and quick-release pins (not shown) which mount the aerofoils 300 and/or the flap ramps 304 securely within the simulator to an area or areas of the grating 290, or as will become apparent, the safety shield mounted to the grating 290. The aerofoils 300 and other wave-forming means of the present invention may also be statically or movably installed under the safety grating 290 as deemed desirable for the creation of recreational waves that are transposed through the grating 290.

A lightweight and repositionable safety shield 314 may be installed atop the grating 290. Safety shields 314, which are generally constructed of the same materials of the wave-shaping and wave-forming members of the invention, may be disposed as shown in the Figures to shield a rider from potentially injurious contact with the vertical and/or horizontal portion of the safety grating 290. Such a separation of a surf rider from contact with the safety grating 290 and as provided by the safety guards 314 may be desirable, as a rider upon the complex character binary surfable standing wave as created by the present invention may achieve not only significant relative speeds upon the standing wave flow created by the present invention but may also become disoriented, lose control or "wipe-out" while surfing on the centrifugally generated standing wave, and contact with the grate 290 in such a state may pose a potential injury threat.

The shield 314 is generally for use in high volume and/or high velocity "extreme" surfable standing waves as can be formed by the present invention, and the safety grating 290 may be utilized without a shield 314. The safety shield 314 may be affixed to the safety grating 290 and/or the central platform 296 by well-known means, such as quick-release pins, bolts or clamps, and may be made of sufficiently clear materials to allow for spectator viewing of surfing action within the invention from a point outside the wave machine of the present invention, or may alternatively be formed from other materials, such as fiberglass. The flow-contacting vertical and horizontal edges of the shield 314 are preferably hydrodynamically shaped to minimize turbulence or the causation of boundary layer separation of the centrifugal wave flow 292 flowing over the safety shield 314, and any aerofoil and/or aerofoil flap mounting hardware or mounting apertures as may be provided upon a shield 314 are preferably streamlined and/or recessed for the same purpose. As will be recognized by those skilled in the art, the safety shield 314 and the wave-shaping and wave-forming aerofoils 300 and/or aerofoil flaps 304 may be fabricated in a one-piece fashion wherein they are molded in the same conformation, as shown in FIGS. 22 and 23. As also shown in FIGS. 22 and 23 dual, mirror images of the wave-shaping and wave-forming aerofoils 300 and aerofoil flaps 304 may be conformed upon the same shield 314, or fabricated in similar fashion in a separate unit from that of the shield 314. In either case, such an arrangement will allow for the formation of either left-breaking (counter-clockwise rotation) wave simulations or right-breaking (clockwise) wave simulations by reversing the rotation direction of centrifugal wave generating pool 286.

Some components of the present invention may be substantially dry during a surfer's ride within the wave machine of the present invention, for example, the upper rim of the outer deck 338. Experienced surf riders may perform board-sport stunts thereupon which are akin to surf-like boarding sports, such as "rail slides" or "inverted handplants" which are not unlike those performed in the land-oriented board sports of skate boarding and snow boarding.

As shown in the Figures, an aerofoil rudder 320 may also be conformed upon the vertical surface of the guard 314 for the formation of tubular wave crests 330 in accordance with the present invention. Additional variable position aerofoil rudders 321 may also be utilized either in conjunction with the statically positioned rudders 320 or singularly to create similar tubular wave formations 330 within the centrifugal wave flow of the present invention. Mechanical means may be provided for quickly and instantly changing pitch, yaw, roll, angle of incidence, angle of attack, or a combination thereof, of a rudder 321, for example, a servo motor 322 and bell crank 324 or cam 326, as shown in the Figures. The rudder 321 may be movably attached to the outer deck or surface of the basin 288, with a shaft, bearing and universal joint assembly 332 being used to rotate the rudder into the centrifugal flow and for the control of same within the flow. Additional control means and/or control surfaces may be provided upon the variable position rudder 321 as deemed desirable, such as a pneumatic or hydraulic jack 318. An elastomeric cover 328 may be used to cover the movable rudder 321 for safety purposes, said cover being attached to either the safety shield 314 and/or the safety grating 290 by well-known means, such as snap fasteners or hook and loop fasteners.

A number of variously shaped or formed aerofoil rudders 320/321 may be fabricated and made available for use within the wave simulating machine of the present invention, so that the tubular formations 330 as created by the aerofoil rudders 320/321 may be changed as desired.

As seen in FIGS. 21, 22, and 23, exit flumes 306 may be used to allow a surf rider to safely exit the standing wave combination of centrifugal standing wave 292 and traditional standing wave 310. The exit flumes 306, being preferably fabricated of fiberglass and not unlike a traditional waterslide, are attached by well-known means to the uppermost downstream edge of the aerofoil flap ramp 304. The exit flume 306, aerofoil 300 and ramp 304 wave-forming combination, and the safety shield 314 may be molded or otherwise fabricated so as to be of a one-piece design. Substantially all of the centrifugal flow 292 which flows over the downstream wave-forming flap 304 or aerofoil 300 flows up and into the flume 306 and down onto the stationary platform 296, thereby safely carrying a surfrider with the flow and to the stationary platform. This embodiment of a recreational standing wave exit system of the invention allows surf riders to safely exit from the compound wave form.

Flow catch grates 334, disposed upon the stationary inner platform 296, allow the water flow from the exit flume 306 to re-enter the centrifugal wave flow generating pool 286. Additionally, the outer circumference of the inner stationary platform 296 may be canted or otherwise conformed at its outermost edges to guide the flow back into the centrifugal wave generator pool 286. By removing the flow in this manner and redistributing it into the exit flume 306 some of the laminar flow of the wave machine may be lost and the flow may turn somewhat turbulent within the flume 306. As the flow is redistributed to the rotating pool 286 via the grates 334 it is returned to a laminar state by centrifugal force at some distance downstream of the grate 334. The distance downstream is dependent on such factors as wave size and magnitude generated, the number of aerofoils 300 and/or flaps 304 disposed upon the safety grate 290 which are removing laminar centrifugal wave flow from the system, and many other factors. The modular nature of the components of the present invention, for example, the lightweight and repositionable safety shield 314, modular wave-shaping and wave-forming aerofoils 300, flap ramps 304, and exit flumes 306, shall make the repositioning of said components easy for fine-tuning the present invention for varying recreational applications and centrifugal wave flows, for example, rearranging the components until the desired laminar wave forms are created on all ramps 304 and/or aerofoils 300 for a specific velocity centrifugal wave flow.

As many wave formations and exit means as can be accommodated within the wave flow is a desired embodiment of the present invention so that the creation of a high-capacity recreational wave machine is realized. Also, this modular nature of the aforementioned components shall make it viable to completely remove said components for special use of the invention. For example, when a very high-magnitude, barreling, high-velocity wave is desired for special professional surf competitions or exhibitions, only one or two complex standing wave formations may be desirable. Additional wave-shaping or wave-forming aerofoils 300 and/or ramps 304, exit flumes 306, or shields 314 disposed within the wave simulator would be undesirable and might ruin the desired high-velocity wave. The present invention also includes an embodiment wherein the positions of the wave-shaping aerofoils 300 and/or the wave-forming aerofoil flaps 304, as well as other previously mentioned components, are permanently mounted within the wave machine as desired.

The modular nature of the present invention may also be used to make a high-capacity river wave ride for amusement parks wherein all the aforementioned safety shields 314, wave-forming aerofoils 300 and/or flaps 304, exit flumes 306, and tubular barrel-forming rudders 321 are removed from the safety grates 290. Aerofoils 300 and/or rudders 320 may be directly attached to the horizontal and/or vertically disposed surfaces of the rotating centrifugal flow generating pool 286 and/or the surface of the grating 290 by well-known means previously disclosed, and ride patrons may be allowed to spin around on floatation means with the rotating flow as created by the invention. A desired recreational aquatic effect is realized by spinning the pool 286 in one direction, stopping the rotation in the given direction and rotating the pool in the other direction. Many desirable recreational fluid formations may be created by this embodiment of the present invention, including but not limited to standing waves, simulated river flows, boils, swirling eddies, and circularly traveling waves.

FIG. 25 shows an alternate method of allowing a surf rider to safely exit the compound recreational standing wave as created by the present invention. An exit net frame 336, which is preferably fabricated of steel or plastic members, is disposed downstream of a foil 300 and flap 304 as shown and affixed by well-known means to the inner platform 296 and the basin 288 wall or the outer deck 338. The exit frame is disposed so as to not interfere with the free rotation of the pool 286. A catch net 340 may be affixed to the frame by well-known means, such as retaining clips or rope, and is stretched taut not only over the exit frame 336 but also down to the surface of the inner platform 296 and/or upon the surface of basin 288 or the outer deck 338, as shown in the Figure. Now, as the centrifugal wave flow 292 rotates around and encounters the foil 300 and downstream wave-forming flap 304, it may then flow up and over into the net 340, after having formed a complex character binary standing wave as previously disclosed. Standing wave riders who are asked by ride monitoring personnel to exit the wave, or who end a surf ride by "wiping out" on the wave, may then be safely deposited downstream of the standing wave within the catch net 340. From within the net 340 they may exit either the deck 338 or the platform 296. In turn, the centrifugal wave flow 292 may then be deposited directly back into the rotating pool 286, as the exit frame 336 and catch net 340 block access to the rotating wave generator pool 286, as shown in FIG. 25, whereby ride patrons would otherwise come in contact with the rotating pool 286. Portions of the exit frame 336 may utilize a safety grating 290, as shown, to aid the rider in his or her debarkation from the ride and to separate riders from the potentially injurious spinning pool 286. The entire exit frame may utilize a grating 290, as deemed desirable. As this embodiment of the present invention returns the centrifugal flow to the rotating pool 286 quickly, laminar flow is more quickly reestablished after it is interrupted by the safety net 340 and/or safety grate 290. This embodiment of the invention is readily capable of creating a multiplicity of laminar standing waves for a high capacity recreational surfing wave machine according to the present invention.

FIGS. 24a, 24b, and 24c depict another embodiment of the present invention. The inner deck 296 may completely adjoin an upper deck 338 and gently spiral into the rotating centrifugally-created circular standing wave in a manner not unlike that of a Nautilus' shell segment. The lowermost portion may have a flow-shaping aerofoil 300 disposed thereon, or the aerofoil 300 may be movably or statically disposed within the flow from a position other than the deck 296, for example, from the upper deck 338, as shown in FIG. 24c. A flow catch grate 334 may be employed as shown to return flow directly back to the centrifugal wave-generating pool 286. This embodiment of the invention may be employed to make a recreational standing wave in a very compact area where only one surfing wave is desired, or may also be capable of making two or more complex character standing waves, as shown in FIG. 24c. As shown, the inner deck 296 serves as not only the inner deck but also performs the functions of the downstream wave-forming ramp 304 and also the safety shield 314, thereby cutting down on the material cost of this embodiment of the invention. Safety grating 290 may be disposed as shown to keep ride patrons from coming in contact with the rotating pool 286. Additionally, a spillway 333 may be employed as shown to return the flow to the inner rotating pool 286.

A static, pre-formed aerofoil rudder 320 may be conformed upon the upper wall of the deck 296, which may make a tubular barreling wave formation 330 at high r.p.m. of the wave-forming system. That is, the rudder will not form the tubular formation 330 unless the upper crest height of the circular standing wave is flowing high enough and at adequate velocity upon the vertical wall of the simulator to encounter the rudder 320, with the invention creating a laminar complex character wave as previously disclosed which remains readily surfable without the tubular formation 330. A positionable aerofoil rudder 321 may also be disposed as shown for the creation of a changeable tubular formation within this embodiment of the invention.

FIGS. 26a and 26b show another embodiment of the invention. A centrifugal rotating and wave-forming pool 286 may be disposed within a larger pool 342 as shown. The pool 286 is encased within an inner deck 296 whose outer circumference is supported upwardly by a safety grating 290, as shown. The lower surface of the grating is in turn in contact with the surface of the pool 342 and supports the upper platform by means of support structures (not shown) such as tube steel, aluminum, or plastic members. A friction drive wheel and motor (not shown) are employed to drive the encased pool 286. Walkways and/or stairways (not shown) may be used to allow park patrons access to the inner deck 296. As the pool 286 is rotated at speed, a specified volume of water 344 within the pool begins to rotate with the pool. As the pool rotates the water, the water rises within and flows around inside the pool 342, creating a flow 346 which is not unlike a river's flow. Now, as the flow moves around the pool 342 it encounters aerofoils 300 and/or aerofoil flaps 304, creating recreational standing waves thereon. Means for moving the aerofoils and/or wave-forming flaps may be utilized, such as a plethora of threaded receptacles integrally formed within the surface of the pool 342 which may then be used to bolt down the aerofoils 300 and/or aerofoil flaps 304 in any number of positions, and spacers may be employed under the wave-shaping and wave-forming members as previously disclosed to change pitch, roll, angle of attack, angle of incidence, or any combination thereof, with yaw of said aerofoils 300 and/or flaps 304 normally being dictated by the position in which the wave-shaping and/or wave-forming components of the present invention are bolted down upon the inner surface of the pool 342. Mechanical means, such as pneumatic jacks 318, may also be used to this end. An additional benefit of this embodiment of the invention is the occasional creation of traveling waves 348 within the river flow 346, upon which a surf rider 294 may ride as they travel around the circumference of the pool. The pool 342 preferably goes from a deeper depth closer to its center, for example, 2 to 6 feet, and gradually gets shallower towards the outer circumference of same, until the pool 342's water containment ends in a zero depth bank 350. The zero depth pool bank 350 and an outer deck 338 are integrally connected, as shown, or may be one and the same component as desired. The zero depth entry bank 350 allows patrons of the ride to safely enter and exit the ride at will. Aerofoil rudder structures 320 may be disposed within the pool 342 as shown to create tubular formations within the river-like flow of the pool. This embodiment of the present invention has several advantages. First, it can be made to be of a large size, for example, from 100 to 5,000 feet in diameter, allowing many park patrons to be accommodated therein. Secondly, it creates a number of aquatic conditions for the enjoyment of the park patrons, such as the circular river flow 346 with which patrons may ride around, traveling waves 348, and surfable standing waves 310, as shown in the Figures.

It will be recognized by those skilled in the art that the pool 342 may be of any size and may be fabricated of any number of suitable materials and either the outer pool 342 or the inner rotating pool 286 of this embodiment of the invention may be formed into any shape, that is, the pools are not limited to a round shape as shown as they may be formed into and have other conformations than those disclosed, therein and/or thereupon. Additionally, the rotating centrifugal flow generating pool 286 may be rotated at widely varying r.p.m. The rotational direction of the pool 286 can also be changed for the creation of widely varying recreational aquatic conditions according to this embodiment of the present invention.

More than one rotating pool 286 can be located in any one pool 342, with the rotating pools rotating in either the same or opposite directions in relation to each other, for the creation of shear flows and other desired recreational aquatic effects as previously disclosed.

Ride patron entrance slides 352, as shown in FIG. 21, which are not unlike the aforementioned exit flumes, may be disposed within any and all of the embodiments of the present invention for the safe entrance of surf riders into the recreational waves of the present invention. Additionally, a slotted ramp (not shown) may be utilized for the safe entrance of surf riders utilizing fins on the bottoms of their surf crafts to stabilize their surf boards or other type craft in the centrifugally created complex character binary standing wave as created by the present invention. For example, a ramp utilizing spaced apart tubular members such as PVC plastic pipe, may by used to this end. The slotted ramps may also be disposed within any and all embodiments of the present invention and may also be used for the aerial launching of surfers by their traveling at speed thereover, or for other sliding stunts thereon. Such ramps may be constructed and used in a manner as disclosed in U.S. Pat. No. 5,213,443, which is incorporated herein by reference in its entirety.

Other embodiments of the invention are of course viable. It will be recognized by those skilled in the art that a version of the present invention may be produced which would fit in a domestic environment, for example, a back yard or other small area. The invention may also be scaled down to make waves of very small size for a toy version of the present invention, or made of aesthetically pleasing materials and design so as to be well suited for use as a fountain-like ornamental structure.

According to yet other embodiments of the present invention, a relative fluid flow may be created by forcing a wave-forming device through a body of water, for example, by pulling a device behind a boat. The device may be mounted on a partially submersible platform or a fully submersible platform.

Regardless of whether the simulated river run is produced by a gravity fed flow of water, a centrifugally rotated pool, or by pulling a wave-forming device through a body of water, the aerofoil may be adjustable to provide various types of waves. As shown in FIG. 5, aerofoils 54, 56 are preferably connected via universal joints 84 to hydraulic linear jacks 86 or similar motion control actuation devices, such as screwjacks or the like, for the quick and instantaneous change of angle of attack, pitch, yaw, roll or combinations thereof, of the aerofoils via fly-by-wire, manual, computer program-controlled, or other control means used for the controlled movement of a motion control actuation device and/or aerofoil. An additional preferred means of controlled movement of the aerofoils, for example, aerofoil 54, is via a motion control base 88. The motion control base 88 is preferably capable of a minimum degrees of freedom (D.O.F.), with regards to the multitude of movements in three dimensions capable by any one or combination of motion bases, of about 2, for example, from about 2 to about 6 degrees of freedom. The portion of a linear jack 86 and/or motion base 88 which juts upwardly from a surface 90 for control of an aerofoil may be encased in a flexible waterproof boot 92, as shown in partial cutaway, to positively protect underlying electrical control systems and like devices used in the aforementioned motion control systems. Other means may be employed to control the movements of the aerofoils including, but not limited to, a servo motor, a servo horn and armature system, a pulley and motor system, a chain/sprocket/motor assembly, and the like. Parallel longeron structures (not shown) may be placed on both sides of an area 90 to simulate river banks. A sidewall may be provided as part of the flume to contain the flow of water across the aerofoils.

The leading edge of the wave-forming aerofoil 56 may comprise a lower front edge portion 57 and an upper front edge portion 59 across which the water flows.

After the simulated river run, represented in the Figures by streamlines 93, forms a surfable standing wave 58 in an area 52 via aforementioned means, the river run may then proceed "downstream" to a field of gravity-feed apertures 94. Preferably, the apertures 94 are of a maximum ½ inch diameter to avoid adverse and unsafe suction conditions in the field of apertures. The portion of an area located downstream of the aerofoils and containing the gravity-feed apertures is preferably angled upward 5 to 15 degrees relative to the upstream portion at area 52 to better facilitate rider exit and fluid drainage therefrom. The downstream portion of the device comprising the field of apertures may, via apertures 94, drain the spent river run into a catch basin 96 from where it is either pumped back up to a water tower through pipe 99 or recirculated for use in a water slide flume 100, as will become apparent later.

The field of apertures 94 and underlying catch basin 96 are located at a downstream portion of an area 52 and may extend as long as necessary for the complete drainage of a simulated river run. In this manner a rider swept downstream from a surfable standing wave 58 created by the aerofoils 54, 56 will eventually end up on a downstream elevated surface of a drained area relatively free of any fluid, thereby allowing the rider to walk away from the downstream elevated exit area. The previously mentioned dimples and/or channels may be used singly, multiply in configuration, or in combination to reduce drag coefficient on the surfaces of the aerofoils and other surfaces of the device for the creation of a laminar river run and a simulated natural surfable standing wave. A uniform flow, wherein the velocity vector is everywhere the same throughout the simulated river run at any one instant, is especially preferred for optimal simulated natural standing wave formation. Therefore, an n factor of 0.012 or less shall be achieved for aerofoils 54, 56, for river simulation flume 34, for the water contact surface of penstock flap 48, and other water-contacting surfaces of the device of the present invention. The n factor is derived from the Manning formula for uniform flow, n being the absolute roughness factor, i.e., the value of n for water and concrete is 0.012 and for water and corrugated metal the n rating is 0.022.

Thousands of solutions for simplified boundary and initial condition parameters have been tabulated and are widely used to this day in numerous broad fields of science, engineering, fluid dynamics, fluvial processes and like fields. The quick and instant variable positioning of aerofoils 54, 56 via aforementioned means, in combination with a variable-position, river simulation flume 34 and variable penstock 44 and other variations of the invention to be disclosed enables a plethora of fluidly dynamic fluid flow variations.

FIG. 6 shows a preferred configuration of the present invention wherein a secondary downstream aerofoil 56 extends upwards from within a recessed chamber 98 disposed as shown. An elastomeric cover 102, fabricated of stretchable waterproof material such as rubber or material not unlike that used on gymnastic trampolines, is water tightly affixed by well-known means to an area positioned over the chamber 98 as shown. Upon the upward extension of secondary downstream foil 56 by jacks and/or motion bases, the cover 102 conforms to the cambered shape of the extended aerofoil 56. By the installation of rollers (not shown) upon the upper surface of the downstream aerofoil 56 and/or greasing the upper surface of the secondary aerofoil 56 with a lubricant of adequate viscosity to allow for a low friction moving contact between aerofoil and cover, it will be apparent to those skilled in the art that, as various motions actuated on the secondary downstream aerofoil 56 by a D.O.F. of from about 2 to about 6, and motions actuated by a motion base and/or hydraulic linear jacks, will be transmitted through the cover to provide a quick and instantaneous change in pitch, yaw, roll, angle of attack, or combinations thereof, of the secondary downstream cambered convex aerofoil 56. Thus, a quick and instantaneous change can be induced upon a simulated natural standing wave formation thereon. The first upstream cambered convex aerofoil may also be recessed in a chamber and fitted with a cover, however, it has been found advantageous to have the lower surface of the first upstream cambered aerofoil exposed to the fluid flow to take advantage of the positive pressure formed under the first upstream aerofoil. The positive pressure as formed on the underside of an aerofoil surface has been found to be advantageous in the formation of simulated natural standing waves as it can, with the addition of a narrow spanwise slot 104, as shown in FIG. 5, of a properly designed contour disposed near the leading edge of a first upstream aerofoil 54, contribute dramatically to the laminar nature of a surfable standing wave 58. The wing slot 104 allows a sheet, as it were, of high pressure fluid flow from the bottom surface of aerofoil 54 to flow up and over the top surface of same. This upward flow retards flow separation in the boundary layer upon the first upstream foil 54 and delays the onset of turbulent flow thereover.

A preferred configuration according to some embodiments of the invention, is, as seen in the Figures, a combination of a wing slot 104 and trailing edge slotted flap 106, with the flap 106 being used to smooth out local fluid flow, for optimal laminar flow upon secondary downstream aerofoil 56, and for the creation of an excellent simulated natural standing wave 58 thereon. The cambered convex aerofoils may be surfaced with previously disclosed dimples or channels, or combinations thereof, for further drag coefficient reduction in conjunction with a wing slot and/or slotted flap.

Referring again to FIG. 6, the secondary downstream cambered aerofoil 56 may, after a certain period of time has passed, be lowered into chamber or recess 98. If the aerofoil 56 is provided with an elastomeric cover 102 thereover, the elastomeric cover may lie unstretched and flat upon the chamber 98 when the aerofoil 56 is recessed in the chamber via aforementioned motion control means. The simulated standing wave formation atop the second downstream aerofoil 56 will then cease. Such quick and instant stoppage of the simulated natural standing wave formation may, in conjunction with the simulated river run created according to embodiments of the invention, as previously described, cause a rider 108 to be quickly and immediately ejected downstream. Downstream of the aerofoil 56, gravity-feed apertures 94 drain off the river run into catch basin 96, enabling the rider to recover from the terminated ride and stand up on the 5° to 15° inclination of the downstream portion of the ride. The rider may walk away under his own power and wait in a line to ride the simulated natural standing wave again.

As seen in FIG. 7, another preferred variable configuration of the present invention comprises a second downstream aerofoil or wave-forming member 110 comprising a transparent material of adequate transparency to permit "underwater" viewing of a simulated natural standing wave 112 and a surf rider 114 riding thereon. The member 110 may be a cambered aerofoil which is preferably plastic and possesses a water-whiteness of 92% or greater for optimal surf action viewing thereon.

Polymethyl methacrylate is a preferred transparent material for the fabrication of a transparent aerofoil 110. A more preferred material for a transparent aerofoil according to embodiments of the present invention is calendared or extruded polycarbonate or polycarbonate/ester alloy plastic, which is not only strong but also flexible. A flexible aerofoil comprising a polycarbonate or polycarbonate/ester alloy plastic may preferably be sufficiently flexible such that if the rider 114 has a fall or mishap during his or her ride on a simulated natural standing wave formed on the plastic aerofoil, the aerofoil will absorb some of the impact and give or bend sufficiently to reduce the impact of the rider on the plastic when compared to a substantially rigid aerofoil material. Thus, by utilizing flexible, high-impact strength polycarbonate plastic for the creation of an aerofoil 110, a rider's impact with the aerofoil is for the most part absorbed and dissipated by the flexion of such an aerofoil. The flexion acts not unlike a shock absorption device with regards to a fallen rider.

The transparent and flexible aerofoil 110 may be formed from a plastic material, for example, polymethyl methacrylate, polycarbonate, or the like, by well-known means, including but not limited to vacuum forming, rotomolding, heat forming, injection molding, blow molding, extrusion molding, and the like.

Referring to FIG. 7, an aerofoil 110 possessing the aforementioned transparency and flexibility allows for spectator viewing from a recessed spectator chamber area 116.

The viewing area 116 may provide visual amusement to those riders waiting to ride the simulated natural standing wave 112, or to relatives or friends of a rider.

A movable hydrodynamic aerofoil rudder 118 may be movably affixed to a point atop a first upstream aerofoil 120 to produce various fluid flow alterations for positive modifications of a simulated standing wave 112 formed by the secondary downstream aerofoil 110. The modifications include, but are not limited to, non-parallel vertically disposed and/or arcing fluid curtains, white water generations, boils, whorls, swirls, wake vortices and the like fluid formations. In fact, any number of miscellaneous aerofoil attachments and/or alterations to the aerofoils of the present invention may be utilized to positively modify resultant simulated natural standing wave formations thereon. These attachments and/or alterations may include nacelles, tri-foil configurations; permanent up and/or down angularizations as found on the tail sections of the F-86 SABRE and/or the F-4E PHANTOM airplanes; faired retention foils not unlike those which support the radar dome atop the U.S. Military's AWACS radar plane; lightweight flexible aerofoils as found on the PAUL MACREADY GOSSAMER CONDOR plane and/or his PATHFINDER plane; single symmetrical "bat" foils akin to the B-2 STEALTH BOMBER and Northrop's YB-49 "FLYING WING"; multiple hard angle-geometry foils as found on the F117A STEALTH FIGHTER; forward sweep foils like those of the experimental fighter plane the "TIGERSHARK"; extreme foil cant such that as found on the wings of the F-4 PHANTOM JET, the F-4V CORSAIR, and/or the JUNKERS 87D STUKA; a vertically stacked bi-foil wing configuration not unlike the WRIGHT FLYER, CURTIS JENNY, PITTS SPECIAL or the SOPWITH CAMEL aircrafts; small trailing edge side-extension foils as those found on the wings of the CURTIS JUNE BUG; a substantially triangular downward foil cant at the ventral trailing edge of an aerofoil, as found on the DOUGLAS DC-10; sweep-wing variable geometry as that utilized by the F-14 TOMCAT JET FIGHTER, lifting bodies such as the NASA X-38, and the like foil variations. According to embodiments of the present invention, any heavier-than-air, fixed- or rotary-wing type cambered foil as found on aerodynes, with attendant attachments including but not limited to empennages, ailerons, flaps, spoilers, rudders, stabilizers, elevators, wing slots, split flaps, nacelles, slotted flaps, tail sections, dual rudders, canard configurations, strakes, drag struts, elevons, fairings and/or fillets, foreplanes, FOWLER flaps, gothic wings, KRUGER flaps, end-plate fins, KUCHEMAN tips, mission-adaptive wings, wing fences, ventral fins, flying boat hull steps, longerons, flex-wings, trim tabs, slats and/or combinations of the above, can form a plethora of preferred simulated standing wave formations according to embodiments of the present invention.

Insectile, piscine and/or avian wing-like aerofoil structures may also be used. Any and all aerofoil profiles, including but not limited to symmetrical, such as the NACA 0012, flat-bottomed, such as the CLARK-Y, and/or under cambered, such as the U.S.A. 2, may be implemented.

FIGS. 8A, 8B and 8C show another embodiment of the present invention wherein a flexible hydrodynamic/aerodynamic ramp or flap 122 may be positioned downstream of an aerofoil foil 124 for the formation of a quickly and instantly variable simulated natural standing wave. The flap 122 comprises a standing wave-forming surface 126. The flap 122 is preferably hingedly connected to a second or downstream or "exit" flap 128. Means are provided to adjust and maintain the flaps 122 and 128 at desired angles with respect to each other. Means may be provided to maintain the flaps in at least two positions with respect to each other, for example, at a riding angle and at an ejection angle. In operation, a preferred wave-forming angle between the flaps 122 and 128 may be from about 90° to about 120°.

The flexible aerofoil flap 122 is preferably fabricated of a clear flexible and strong plastic material such as polycarbonate sheet plastic. The aerofoil flap 122 also preferably possesses a water-whiteness, for example, a clarity of 92% or greater for spectator viewing from behind the aerofoil flap 122 by means of a recessed spectator chamber 130.

It is preferred that the hydrodynamic aerofoil flap 122 is of sufficient flexibility so that the force of the simulated river run from a delivery flume 132 upon the flexible aerofoil flap 122, in conjunction with up, down or other motions actuated upon the airfoil flap 122 via hydraulic linear jacks 134 and/or motion bases, provide quick and instant changes in the camber, warping, or combinations thereof, of the hydrodynamic flexible transparent flap 122 and the combination of flaps 122 and 128. The changes in the flap(s) thereby enable quick and instant changes to the resultant simulated natural standing wave formed on flap 122. The linear jacks are preferably movably affixed to the flexible aerofoil flap 122 and/or 128 via universal joints 136 affixed by well-known means.

A multiplicity of universal joints 136 may be pre-affixed to the flexible aerofoil flap 122 so that the linear jacks 134 and/or motion bases may be moved and/or added as desired and fastened to any of the number of universal joints 136 as desired. Pin and/or pivotjoints may also be used. This variable motion actuation device location configuration will allow for daily, weekly, monthly, or other periodic or random changes to the nature of the cambering, warping or other like or similar quick and instant shape-changing characteristics of the flexible transparent aerofoil flap 122 via the changeable configuration of the linear jacks 134 and/or motion control bases, preferably via changeable configurations of motion control bases having D.O.F. ratings of from about 2 to about 6. With such a changeable motion control configuration, regular repeat surf riders will have an almost endless variety of cambering, warpings, or other like or similar quick and instant changeability of an aerofoil flap 122, which can be chosen on a day-to-day or other time-variable basis. The variety of shapes of a simulated standing wave forming aerofoil flap 122 thereby allows for a variety of quick and instantly changeable simulated natural standing wave formations.

As will be recognized by those skilled in the art, a simulated natural standing wave which is not only quickly and instantly variable during a surf rider's ride thereon but also from a day-to-day, week-to-week, etc., basis is preferable to a fixed simulated natural standing wave generation system. Natural surfable standing waves change shape naturally over time as do natural traveling ocean waves, and the changes in shape may be quick and instant during a surf ride thereon and over days, weeks, months, etc., due to new sand formations, swell directions, shifting antidune alluvial channel formations, and the like natural causes. The quick and instant changes and long-term variable changes to the nature of a simulated natural standing wave formation may hold the continued interest of a rider due to the exciting and unpredictable nature and varying challenge of the surfing waves and the resultant unpredictable ride thereon. According to some embodiments of the invention, elongated aerofoil longerons (not shown) may be used to simulate river banks, which not only help focus the simulated river run but also aid in ride throughout capacity.

Referring more specifically to the nature of the flexible aerofoil flap 122, any number of flexible materials may suffice, including but not limited to unsaturated polyester plastics in conjunction with a fiberglass reinforcement material, stainless steel sheeting, thermoplastics, and like and similar materials. Calendared or otherwise processed polycarbonate and/or polycarbonate/ester alloy sheets are a preferred material for the fabrication of flexible aerofoil flaps 122, due to the superior impact strength, flexibility and water-whiteness characteristics these materials exhibit. A flexible aerofoil flap fabricated from polycarbonate sheet plastic preferably possesses the following characteristics: 1) a tensile strength, yield, as per ASTM test D638 of minimally 8.0 and maximally 11.0; 2) a tensile modulus as per ASTM test D638 of minimally 3.0 and maximally 5.0; 3) a flexural strength, yield, as per ASTM test D790 of minimally 13 and maximally 15; 4) a flexural modulus as per ASTM test D790 of minimally 3 and maximally 5, and; 5) a hardness of between M70 and M85.

FIGS. 8A and 8B show a flexible aerofoil flap 122 which may be completely lowered to a horizontal position to effect a timed rider ejection from a simulated natural standing wave formed thereon. After a rider surfs the simulated wave for a predetermined amount of time, hydraulic linear jacks 134 and/or motion control bases may lower the flexible aerofoil flap 122 substantially, preferably completely, to a horizontal position or a horizontally-disposed angle of about 180°. The simulated natural standing wave formed on the front surface of the flap facing the flow of water will then cease to exist. As the flap 122 is lowered, so too is exit flap 128 which is fabricated of materials which may be the same or different than the material of flap 122. The exit flap 128 may comprise a material useful for the construction of aerofoil flap 122. The exit flap 128 is hingedly connected to the uppermost edge of aerofoil flap 122 via hinges or universal joints 136 or other suitable means.

As the flexible aerofoil flap 122 is lowered by the jacks 134, bases or other means, exit flap 128 is lowered down and backward via its sliding connection in a guide slot at each bottom corner of flap 128, or by well-known means at as many points as deemed necessary to support the hinged combination of flaps 122 and 128. Guide rollers in slots may be used in between the bottom corners of the exit flap 128 along the lowermost edge of the exit flap 128. A plurality of roller mechanisms 138 may be used to support, guide and/or maintain the position of flap 128 and its hinged connection with flap 122. According to some embodiments of the present invention, roller mechanisms 138 may be rotatably installed within slider tracks 140. If guiding slider tracks 140 are employed, the tracks may be recessed into the surface of the device or flume or river run.

As both the flexible aerofoil flap 122 and an exit flap 128 are lowered by linear jacks 134 and/or motion bases, a rider upon a simulated standing wave 142 created upon the aerofoil flap 122 is safely, quickly and immediately ejected along with the simulated river run downstream. Downstream, the finished rider may exit the elevated exit area which may comprise a field of gravity-feed apertures or continue downstream to ride a connected water slide 100, described in more detail below.

Another embodiment of the invention is shown in FIG. 8C. As seen in FIG. 8C, the flexible aerofoil flap 122 may be fabricated with an asymmetrical uppermost edge 144 for a quickly and instantly variable simulated natural standing wave character. As seen in FIG. 8C, a rider may enter the simulated natural standing wave 145 via a slotted roller ramp 146. The slotted roller ramp has a slot or slots provided in the roller ramp to accompany the rudder or rudders normally found on a surf craft 148. The rollers are preferably horizontally disposed and affixed by well-known means thereon on either side of the one or more rudder slot for a near frictionless entry of a rider 150 atop surf craft 148 onto the surface of a simulated natural standing wave 145.

Depending on the quickly and instantly changing cambers and/or warpings of the asymmetrical flexible transparent aerofoil flap 122, any number of the areas of the flap, including but not limited to the uppermost edge of the aerofoil flap, may be at any point in time engulfed with, partially engulfed with, or completely devoid of a simulated natural standing wave formation as created via a simulated river run thereon. The cambers and warpings may be due to forces exerted by and transposed upon the flap 122 via linear jacks 134 and/or motion control bases and/or due to the pressure upon the exposed outermost surface of the flap 122 by a simulated river run according to the present invention. The river run and the resultant simulated natural standing wave formation may be quickly and instantly variable via aforementioned mechanical means. Therefore, at any time during a rider's ride on the simulated natural standing wave 145, created by the present invention, any number of simulated natural standing wave characteristics, or the quick and instant change in or lack thereof, may exist at any point of time during the ride thereon. It is in this context that a simulated ride of a rider 150 is shown in FIG. 8C.

As shown in FIG. 8C, a rider 150 in a first position 152 may roll down a ramp 146 atop a surf craft rolling upon rollers 148 horizontally disposed on the ramp and affixed on either side or sides of the slot or slots recessed within the ramp 146. The slot is provided for the safe gliding of the rudder of the surf craft which is normally disposed on the surf craft for the hydrodynamic stability of the craft.

As seen in FIG. 8C, a rider rolls onto the simulated natural standing wave 145 created by an aforementioned system. The wave may be created by one or more aerofoils 154 and/or by a flexible aerofoil flap 122. The rider can alternatively bank port to starboard and back across a simulated natural standing wave 145, as is natural for surf riders upon not only natural standing waves but also natural ocean waves. In this fashion a rider may traverse from a point 156 upon a simulated natural standing wave to a point 158 on the same wave, and at such a point 158 the rider 150 may ride within an artificially-created liquid tubular curtain 160 created by a wave enhancer system as described below.

According to the embodiment of FIG. 8C, a rider may glide up the standing wave 145 to a point 162 upon a flexible aerofoil flap 122 that is at least partially, preferably completely, devoid of a simulated standing wave formation via the river run. As seen in the Figure, fluid balding of an uppermost area of a flexible transparent aerofoil flap 122 allows a rider 150 to execute specialized stunts normal to dry-land board-oriented sports similar to the sport of surfing, the moves being executed upon the fluidly balded area of the aerofoil flap. As seen at position 162, a rider 150 may, at his or her discretion, perform an inverted maneuver as shown, which is not unlike a gymnast's handstand or the like. The rider 150 may then elect, after lowering himself from the inverted handstand, to execute a board sliding maneuver from a position 164 atop the uppermost edge of the flap 122 and/or the uppermost edge of an exit flap while slidably moving downward to a point 166 thereon. The rider may then elect to shift his balance forward for a re-entry past the fluidly balded area of aerofoil flap 122 for a renewed ride upon the simulated natural standing wave. The rider 150 may elect to perform any number of hydrodynamic, aerodynamic and/or dry stunt maneuvers at his discretion upon the quickly and instantly changing simulated natural standing wave created upon the flexible transparent aerofoil flap 122 and/or the aerodynamic aerofoil 154 according to the present invention.

As previously disclosed, it is preferable that a time limit be imposed on the duration of a rider's ride upon the simulated natural standing wave 145, and that a system comprising the exit flap 128, recessed slider tracks 140 and roller mechanisms 138, as shown in FIGS. 8A and 8B, may be employed. These features, in conjunction with the controlled downward movement of the aerofoil flap 122 and the exit flap 128 via hydraulic linear jacks 134 and/or motion bases, provide for the safe, timed and timely ejection of a rider 150 from the simulated wave.

The flexibility of the flap 122 is preferably sufficiently flexible so as to cushion a rider's fall and dissipate the impact throughout the area of the aerofoil flap 122 where impact occurs. Preferably, the shock-absorbing nature of the flap 122 acts in a manner not unlike that of a leaf spring, thereby promoting a safe and injury-free simulated natural standing surfing wave ride. For additional safety, the edges of the aerofoil flap 122, particularly at points where flap 122 is hinged to flap 128, may be beveled and/or padded as deemed necessary.

The warping and/or cambering of the transparent flexible aerofoil flap 122 has precedence in such fluidly flexible foil innovations as "wing warping" as disclosed by Orville and Wilbur Wright's airplane patented in 1909, Otto Lilienthal's gliders, Spanier and Bourne's rotating asymmetrical foil for wind surf sailing, and hang glider flexible aerofoil configurations. With regards to the aforementioned Wright Brother's invention, means were provided to warp the aerofoils of their aircraft, which subsequently caused changes in the fluid flow over said aerofoils, allowing their craft to controllably maneuver in a fluid environment. With regards to the aforementioned gliding craft and wind sails, the camber of these foils is for the most part induced by the pressure of a fluid flow thereon and/or thereover said foils, said foils of gliding crafts and/or wind sails being sufficiently flexible so as to allow the pressure imposed upon such foils by a fluid flow to cause the camber upon said aerofoils. According to embodiments of the present invention, it is not only the controlled warping of an aerofoil flap but also the sufficient flexibility of the flap for fluid flow pressure-created camber and/or flexion thereon, that allows for the creation of a quickly and instantly changing and changeable simulated standing wave.

As seen in FIG. 8C, an adjustable rudder 155 may be provided under the aerofoil 154 to further shape the flow of water. As also seen in FIG. 8C, an adjustable rudder 157 may be provided to guide the flow of water, for example, toward a central portion of the flexible transparent aerofoil flap 122.

According to embodiments of the present invention, the aerofoil 154 shown in FIGS. 8A, 8B and 8C may be reinforced across its surface as deemed necessary by flexible steel, plastic or like spar members. The spar members may be individually or collectively of the same or varying degrees of flexion for variable flap warping characteristics. Preferably, all connecting means and components for the movement, control, and/or positive retention of an aerofoil and/or flexible aerofoil flap, as well as the aerofoils and/or flaps themselves, are fabricated of materials possessing sufficient tensile strength and engineering integrity to eliminate the possibility of aero-elastic divergence, flutter, or cavitation. These problematic phenomena are phenomena wherein fluid flow forces, or moments, increase too quickly for the elastic restorative forces of aerofoil couples. In aeronautics, the ultimate result of aero-elastic divergence is to twist or otherwise forcibly remove aerofoils from the fuselage and/or empennages. With regards to the present invention, divergence is generally undesirable for safety reasons.

Other possible configurations, formations of and alterations of the present invention include but are not limited to: 1) a reversed position of a first upstream aerofoil relative to a secondary downstream aerofoil and/or a flexible aerofoil flap, forming a simulated natural standing wave according to embodiments of the present invention; 2) spring-mounted or point-of-contact padded universal joints 136 may be used to allow for a safe impact of a rider should the rider fall directly atop the universal joint 136; 3) the formation of wake vertices 168 and resultant upwash and downwash regions in downstream areas of an aerofoil, as is natural when an aerofoil is immersed in a fluid flow; 4) the entire system as disclosed according to embodiments of the present invention wherein the entire system is itself mounted to a 2 to 6 D.O.F. motion base, allowing not only riders, but also spectators within a spectator chamber to enjoy the thrill of quick and instant changes to a standing wave and the quick and instant movement in two to six degrees of freedom of a spectator chamber, and; 5) the motion bases and/or hydraulic cylindrical linear jacks may be controlled by means including but not limited to power controls, fly-by-wire controls, computer programmed "pre-set flight paths" for aerofoil movement control, or other viable control means. Wake vertices 168 and/or said upwash/downwash regions flowing into a simulated natural standing wave 145 from a first upstream foil are desirable, as they accent the already unpredictable nature and resultant continued interest in riding a simulated natural standing wave as created by the present invention.

Referring now to FIGS. 9A, 9B, 9C, 10 and 11, a wave enhancer system may be employed for the simulation of that portion of a surfable ocean wave which does not occur naturally on surfable standing waves as they form upon rivers. A natural and surfable standing wave on a river may possess an excellent wave quality for the riding thereon by surfers; however, such natural standing waves do not possess a tubular curtain of water as occurs on ocean-borne surfing waves. Waves exhibiting tubular fluid curtains are prized by surf riders for the thrill and challenge of riding within the fluid tubular curtain or "tube". The present invention provides a wave enhancer system which simulates a fluid tubular curtain on a simulated natural standing wave 170 as created by the present invention.

According to some embodiments of the present invention, a wave enhancer system comprises four interconnected components: a constant delivery pump 172, a pipe line 174 from the pump 172 to a fluid curtain disbursement chamber 176, which transfers a fan-shaped fluid curtain to a flexible tube formation member 178. The flexible tube formation member 178 is preferably flexibly controlled by a servo control system 180 and/or hydraulic linearjacks. As the constant delivery pump 172 draws fluid from a catch basin or other source and pumps it at pressure through the pipe line 174 into the fluid curtain disbursement chamber 176, the pressurized fluid discharge fans out from the chamber 176. The fluid discharge emanating from the chamber 176 is shot at close range at a flexible tube formation member 178. The tube formation member 178 is preferably quickly and instantly changeable in curvature and/or angle via aforementioned mechanical means to facilitate quick and instant changes in a simulated tubular fluid curtain form by a fanned fluid discharge flowing into, upon and outwardly from the member 178.

Referring to the characteristics of each component of a wave enhancer system according to embodiments of the present invention, the constant delivery pump 172 may be of any type suitable to the normal high-pressure application of fluid discharge, including but not limited to centrifugal, split-casing, submersible, and vacuum pumps. An alternate means of creating a high-pressure fluid discharge is to provide a chamber 182, as seen in FIGS. 2A and 3, integrally connected to a water tower 30 as shown. The head of a body of water in the chamber 182 may supply adequate pressure to a pipe line 174 and/or a fluid curtain disbursement chamber 176 for the formation of a curtain of water according to the present invention.

Pipe line 174 may be constructed of any number of well-known materials suitable to high-pressure fluid pumping application, as well as any connectors, couplings, valves or like or similar devices that may be utilized as part of and/or connected to pipe line 174 as deemed necessary. It is a preferred embodiment of the present invention to have the segment of pipe line 174 that traverses across any portion of a transparent aerofoil and/or flaps 184 to be made of flexible transparent piping and/or tubing so as to minimize interference of the viewing of underwater surf action by spectators from a spectator chamber 186. The flexible transparent tubing and/or piping segments of the pipe line is preferably of sufficient flexibility to allow for any combination of movements of an adjacent airfoil and/or flap.

The fluid curtain disbursement chamber 176 of a wave enhancer system according to embodiments of the present invention may comprise a fan-shaped unit 188, or other desirably shaped unit. The unit 188 may be connected to a pipe line 174 by well-known means, including but not limited to threaded couplings, hose clamps and/or flexible connectors. The fluid curtain disbursement chamber 176 is formed in a shape and geometry not unlike a tapered vacuum cleaner attachment, with the inner chamber of 176 being normally $\frac{1}{8}$ to 3 inches in width, and 1 to 10 feet in both vertical and/or horizontal length. It is preferred that the exit vent of the fluid curtain disbursement chamber 176 tapers to a width smaller than the inner bore of the chamber 176 for optimal exit pressure and outward fanning of the fluid curtain emanating therefrom. Chamber 176 may be fabricated of any number of well-known materials, including but not limited to fiber reinforced plastics, thermoplastics, stainless steel, anodized aluminum, transparent polycarbonate, flexible rubber, and like or similar materials. Additionally, fluid curtain disbursement chamber 176 may preferably be mounted to an aerofoil and/or flap 122 via flexible mounts (not shown) to allow for positive retention of the chamber upon the aerofoil and/or flap during movement of the aerofoil or flap as previously described. An elongated fluid curtain disbursement chamber may extend from and be integrally connected to a lowermost portion of a water tower chamber 182. An elongated fluid curtain disbursement chamber acts to pressurize and disperse an elongated fluid curtain, as seen in the Figures.

According to embodiments of the present invention, the wave enhancer system may comprise a flexible tube formation member 190. Member 190 may be fabricated of a material of sufficient flexibility to allow quick and instant changes in curvatures, angularizations, cambering and like or similar changes to the shape of a member 190 via a servo motor control system 192 and/or hydraulic jacks 194, as shown in the Figures. The member 190 is preferably flexibly connected to an aerofoil and/or flap adjacent to the exit vent of a chamber 176. Now, as a fluid curtain shoots out of chamber 176 onto a member 190, an elongated tubular partition of water 196 arcs therefrom up and over the flap 122 as seen in FIG. 9C. The tubular fluid partition characteristics, including but not limited to angle of descent, curvature and length, are quickly and instantly changeable via the aforementioned quick and instant change in the shape of flexible tube formation member 190. The length, thickness, width, stiffness, and like or similar physical characteristics of the member 190 can be varied, as long as the flexible member 190 is capable of creating the desired fluid curtain. One or more slit 198 shall be disposed as shown in the Figures for the outward projection of a tubular partition of water 196 as created by the wave enhancer system. If provided, the slit 198 may be between about ½ and about 3 inches in width and as long as deemed necessary, for example, from about one to about five feet in width.

Now, referring to the wave enhancer system of the present invention as a whole, the invention is capable of producing a quickly and instantly changeable tubular arcing fluid curtain 196 for riding therein by a rider, wherein the system produces a tubular partition of water of a length heretofore unknown to amusement surfing wave pools and/or other wave simulators and previously only created by natural ocean waves. The wave enhancer system achieves this objective by its inherent separation from the simulated natural standing wave-forming means according to the present invention. By separating simulated standing wave formation from the fluid tube formation means, interference from a simulated river run and/or a fluidly thick plunging tube section in the formation of an elongated fluid arcing curtain is minimized. Also, as the elongated tubular fluid curtain 196 as created by the present invention is relatively thin when compared to a natural arc, it is safer for a rider to ride therein. The fluid curtain 196 preferably does not have the momentum, force or impetus to carry a rider up and over with itself for an inevitable unsafe, high-impact collision with the surface of an aerofoil and/or flap 122. Such unsafe collisions are known to occur not only in natural ocean wave surfing but also upon previously created surfing amusement devices, with the result having proven injurious to surf riders in both cases. Therefore, the thin fluid arcing tubular curtain as created by the present invention is a preferred tube simulation, not only for aforementioned safety reasons but also for the creation of elongated barrel formations wherein a rider may ride safely, deeply and for a long time.

Various alterations of the present invention are provided and alterations that create desirable simulated natural standing wave formations for the performing of surf- or similar board-sport activities thereon. It is in this spirit and scope that the present invention as shown in FIGS. 4, 12, 13, 14, 15, 16, 17, 18A, 18B, 19 and 20, is disclosed.

Figure 12:
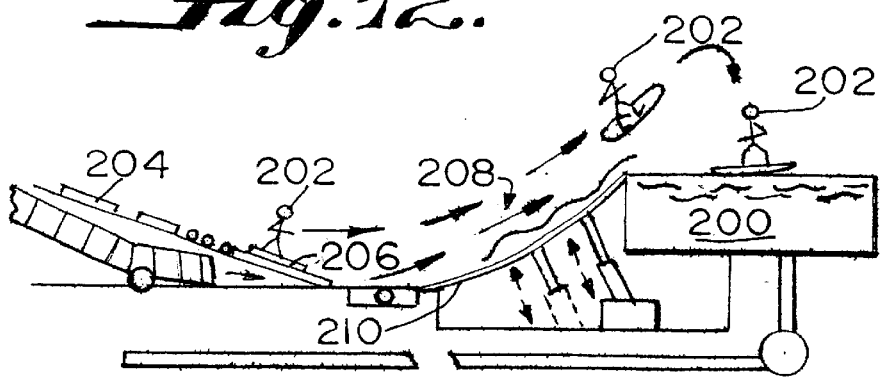
FIG. 12 shows a side-cutaway view of a preferred alternative configuration of the present invention which allows for surf stunt jumping maneuvers.

Referring to FIG. 12, a preferred variation according to embodiments of the present invention, is to provide a water tank 200 downstream of a transparent flexible aerofoil and/or flap (not shown) to allow for aerial stunt surfjumping as is natural for coastal surf riders upon near-shore waves. As seen in FIG. 12, a rider 202 may roll down a slotted ramp 204 while on a surf craft 206 with the bottom surface of the surf craft rolling upon ramp rollers disposed as part of the ramp 204. With a sufficient forward momentum of the rider having been achieved, the rider may glide up the simulated natural standing wave 208 created upon an aerofoil or flap 210 and, having achieved an escape velocity therefrom, launch into the air downstream of the aerofoil or flap for the performance of any number of complex gymnastically-oriented aerial stunts while airborne. After having reached a maximum apogee and heading earthward, the rider 202 may safely splash down in tank 200 fabricated at least partly of a transparent material to facilitate spectator viewing of the splashdown. The depth of the body of water disposed in the tank 200 is preferably of sufficient depth, normally four feet or more, to allow for a incident-free splashdown of a rider 202 after a high launch trajectory with or without an airborne stunt maneuver as previously described. In some embodiments, a mechanism may be provided to shape the standing wave 208.

Figure 13:
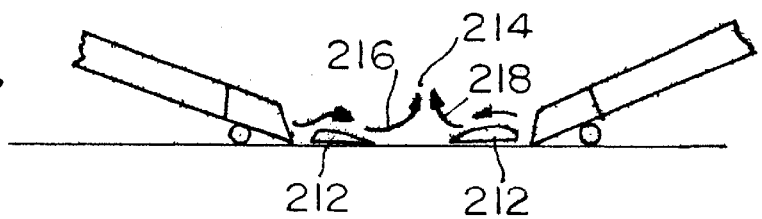
FIG. 13 shows a side-view of an alternative configuration of simulated standing wave-forming aerofoils according to the embodiments of the present invention.

An alternative aerofoil configuration according to embodiments of the present invention is depicted in FIG. 13. By providing diametrically-opposed river runs as shown and affixing aerofoils 212 with their cambers facing toward or away from each other as shown, a two-sided simulated standing wave 214 may be formed. The hybrid standing wave formed in this fashion is exciting and interesting to ride as a surf rider may hydrodynamically maneuver from one wave 216 to the other wave 218 as he desires, executing any number of surf stunt maneuvers not only upon the standing waves, but also upon the upwardly disposed dual-crest of the two-sided wave 214 created by the configuration.

Figure 14:
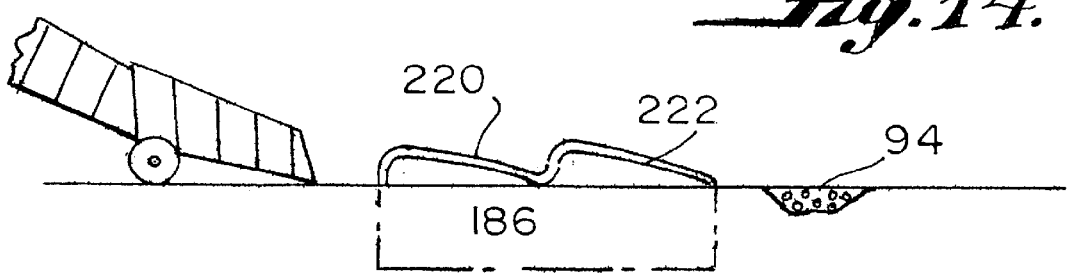
FIG. 14 depicts a side-view of a wave-forming device according to embodiments of the present invention.

As seen in FIG. 14, upstream and downstream aerofoils 220,222 may be fashioned in a one-piece configuration and may comprise a plastic material selected from the group consisting of unsaturated polyester plastics in conjunction with a fiberglass reinforcement material, stainless steel sheeting, thermoplastics, and like materials. Calendared or otherwise processed polycarbonate and/or polycarbonate/ester alloy sheets are a preferred materials for the fabrication of the one-piece structure due to the superior impact strength, flexibility and water-whiteness characteristics these materials exhibit. A one-piece dual aerofoil structure according to embodiments of the invention and fabricated from polycarbonate sheet plastic preferably possess the following characteristics: 1) a tensile strength, yield, as per ASTM test D638 of minimally 8.0 and maximally 11.0; 2) a tensile modulus as per ASTM test D638 of minimally 3.0 and maximally 5.0; 3) a flexural strength, yield, as per ASTM test D790 of minimally 13 and maximally 15; 4) a flexural modulus as per ASTM test D790 of minimally 3 and maximally 5, and; 5) a hardness of between M70 and M85.

Figure 15:
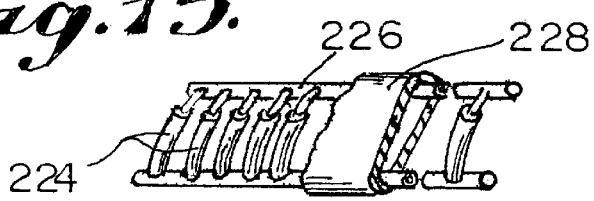
FIG. 15 shows a partial-cutaway plan view of a quickly and instantly variable simulated natural standing wave-forming device according to the embodiments of the present invention.

FIG. 15 depicts a variable-geometry aerofoil configuration for the formation of quickly and instantly changeable simulated natural standing wave creation(s) thereon. Flexible telescopic pipes 224, or other suitable flexible and telescopically interconnected members, are disposed as shown, with flexible fiber-reinforced plastic battens 226, or similar suitable flexible components, being connected to said pipes 224 and hinged thereto by hinge means. Asymmetrical flexible battens may also be used as desired. An elastomeric cover 228, fabricated of material not unlike that of a trampoline, may cover the aforementioned assemblage of components 224, 226. The cover 228 may be affixed to the battens 224, for example, by sewing, snap fastening or hook and loop fastening. Telescopic sections 224 may be telescoped in and out and/or parabolically flexed by activation of telescoping and retracting means including but not limited to steel cable/pulley/motor systems, servo motor systems, cam and motor systems, and chain and sprocket systems. The telescopic and/or flexible battens can change shape due to the flexion or mechanical force imposed thereon and resultant changeable aerofoil shape characteristics are transmitted throughout the elastomeric cover 228. It is by such means that an aerofoil is provided which is quickly and instantly changeable in cord, camber, wingspan, aspect ratio, or combination thereof, and capable of the formation of a simulated natural standing wave according to the present invention.

Figure 16:
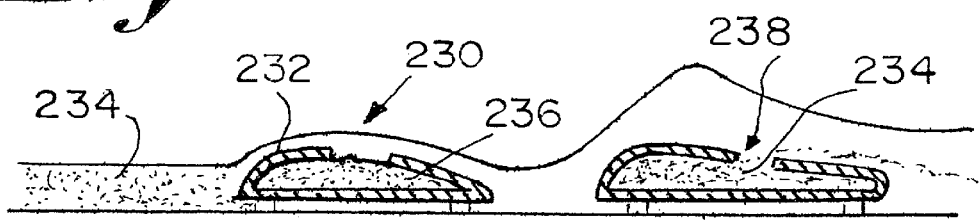
FIG. 16 shows a side-cutaway view of an aerofoil for real sand antidune simulation according to embodiments of the present invention.

FIG. 16 shows an alternative aerofoil 230 provided for "real sand" antidune/foil formation according to the present invention. A cambered front grate 232 may be disposed as shown for the introduction of sand 234 or other material through the apertures normally disposed in a grate 232, the sand 234 being deposited into the aerofoil 230 via a river run, simulated or otherwise, carrying sand, pebbles, gravel, or like particulate or granular materials. A trailing edge catch pocket 236 is fabricated of any of a number of well-known materials and is provided as shown for the positive retention at the downstream portion of an aerofoil 230 of any sand or other material trapped in the aerofoil. A top vent 238 may be provided as deemed necessary to bleed off excess granular material as needed for purposes such as emptying and moving the location of a foil 230 of this nature. An aerofoil constructed in this fashion may be used in conjunction with a simulated river run as created by the present invention or in actual river runs in which granular or other material is found for the filling of the inner cavity of the aerofoil via river deposition therein.

FIG. 17 discloses a means for a flexible aerofoil formation which is not only sufficiently flexible so as to cushion a rider's fall thereon but also variable in distance via mechanical means in relation to each other and to a flume or chute 240. Elongated, flexible mats 242, fabricated of thick flexible rubber, plastic or other suitable materials, are disposed as shown in the Figure and affixed by well-known means at their upstream edges to an area 244 of the wave simulation device. The downstream edges of the mats 242 are folded over as shown and preferably reinforced on their undersides via flexible battens for positive camber retention thereon. The folded downstream edges of a mat 242 are affixed adjacent both outermost sides thereof to roller mechanisms within each of two recessed mechanical tracks disposed on both sides of the mat. The tracks and sliding retainers allow the batten-reinforced folded area, for example, the aerofoil shaped from or conformed upon the mat, to be towed via mechanical means affixed, for example, to the sliding retainers. The mechanical means may be selected from the group consisting of steel cable/pulley/motor systems, servo motor systems, cam and motor systems, and chain and sprocket systems.

As the flexible aerofoils as conformed upon the surface of mats 242 are mechanically moved upstream and/or downstream, various preferred simulated natural standing wave formations may be formed by the quickly and instantly changing distance between the aerofoils created on the mats.

According to some embodiments of the invention, a corner of the mat may be attached to a mechanically controlled sliding retainer housed in a recessed mechanical track and may be towed ahead of and/or behind an opposing mechanically-controlled sliding retainer affixed to an opposite end of a folded aerofoil conformation upon the mat. The opposing mechanically-controlled sliding retainer may be disposed diagonally across the mat with respect to the corner to which the retainer is attached. The resultant controllable aerofoil can be skewed, warped or otherwise influenced so as to provide a changeable aerofoil-shaped folded leading edge.

As seen FIGS. 18A, 18B and 19, a flexible aerofoil 246 as conformed upon a lowermost end of a flexible mat 248 may be manipulated, via mechanical means to be disclosed, to form a traveling surfing wave in a narrow channel. As seen in the Figures, an elongated flexible mat 248 is disposed at one end within a body of water. The body of water is within a narrow channel 250. The other end of the mat 248 is connected to a lift bar 252. One or more cable 254 is affixed to the lift bar 252, threaded through pulleys 256 disposed atop and upon a raised lifting tower 258, and connected to a motor and pulley 260. The motor and pulley 260 lifts the mat 248 to an uppermost portion of the lifting tower 258. The motor and pulley 260 has a clutch or other release device which is employed to drop the flexible mat 248 from its raised position on the lifting tower 258. A weight 262 may be affixed to the lift bar 252 to speed up the drop speed of the flexible mat 248. As the flexible mat is dropped in this fashion it causes a wave to travel down the body of the flexible mat in a manner not unlike that experienced when one snaps the end of a bed sheet or rope and a similar wave travels throughout its length, as seen best in FIG. 18B. This causes an energy oscillation to be translated from the lowermost end of the mat which preferably possesses a folded, batten-reinforced aerofoil 246 conformed thereon for optimal energy translation to the body of water disposed in the channel 250. Shock-absorber stop mechanisms 264 are disposed as shown upon the tower 258 to stop the descent of the mat.

The wave of energy is transmitted to the body of water 266 and, when this energy oscillation reaches the shallower portion of the channel 250, as shown in the Figures, the wave is jacked-up into a surfable traveling wave 268. To better facilitate the formation of the traveling wave 268 it is preferred that the depth of the shallow portion of the channel 250 be four feet or less and the width of the channel be twenty feet or less to better focus the energy of, and thereby create a higher-quality, traveling wave according to the present invention.

When the traveling wave reaches the far end of the channel 250 it then again enters deeper water and is allowed to enter a chamber fronted by a one-way floating weir 270, which allows wave energy to enter the chamber but dampens or completely prohibits its release from the chamber. The weir minimizes clapotis, wherein a traveling wave refracts from the opposite wall of the container and travels in the reverse direction. Clapotis is generally undesirable for safety reasons. Grates 271 are disposed as shown to prohibit a rider (not shown) from coming in contact with injurious portions of the device, including the one-way floating weir. The bottom of a channel 250 may be made of flexible members (not shown) such as flexible fiberglass sections, thick rubber with leaf springs disposed throughout its length and/or width, and like or similar means. The floor of a channel 250 is therefore raisable or lowerable at various intervals and points via hydraulic linear jacks 272 disposed as shown.

According to embodiments of the invention, well-known natural surfing reefs known to create the most prized, natural traveling wave formations may be grid-mapped by well-known oceanographic and/or topographical means. The coordinates of the reef heights, lengths, accompanying canyons and/or channels may be fed into a computer motion control program, and the resultant heights, channels, etc. can be conformed upon the flexible surface of the bottom of channel 250 via the raising and/or lowering of the flexible channel bottom by jacks 272. Accordingly, the invention can mimic well-known, first-class traveling surfing waves. As seen in FIG. 19, the channel 250 may angle substantially relative to the aerofoil wave-formation means to better simulate natural traveling waves, wherein a surf rider may travel forward and diagonally across a breaking wave face.

The sides of the channel 250 are preferably fabricated of a transparent plastic for spectator underwater viewing of surf action taking place therein. Elongated aerofoil nacelles, canoe fairings, or longerons may divide the channel into parallel sections so that multiple surf riders may ride the traveling wave created therein at any one time without colliding with one another, for a high-capacity natural wave simulation ride according to the present invention.

As seen in FIG. 20, a conveyor belt 274 is provided and one or more aerofoil 276, 277 and/or an aerofoil flap may be attached to an exposed upper surface of the conveyor belt. A motor 278, coupled to one or more of conveyor rolling mounts 280, may move the conveyor-bound aerofoils through a water-filled tank 282, thus creating upon the surface of a second downstream cambered aerofoil 277 a moving version of a simulated natural standing wave thereon. An entrance means and splash-down tank (not shown) may be provided for riders to enter safely and exit such a simulated natural standing wave ride according to the present invention. "Count-down" numbers may be embossed upon the conveyor belt and precede the first aerofoil 276, indicating to a rider when it is safe to enter the water within the tank 282 in concert with the approaching simulated natural traveling wave.

As shown in FIGS. 2B, 6, 7, 9A, and 17, one or more gravity induced water slide flumes 100 may be connected to a downstream portion of the wave simulator for a secondary ride element connected to the simulated natural standing wave attraction. The water slide flumes or chutes 100 may use a flow of water from the downstream fluid discharge of the wave simulator. The chutes 100 may use water pumped or gravity-fed from a catch basin, for example, a catch basin for draining water at a rider exit region of the wave simulator attraction. The flume 100 preferably has a downslope angle of 15 degrees or more to facilitate optimal gravity-induced propulsion of a rider thereon. Aerofoils or other features of the present invention as previously described may be movably or statically affixed at any number of points along the flume so that a rider propelled by gravity down the flume may experience wave-like aquatic conditions thereon. For example, aerofoil rudders may be implanted in the upper curvature of a flume or chute 100 to create a tube-like fluid formation that a downwardly propelled rider may traverse through on his or her way to a splash-down pool. A wave enhancer system, as previously disclosed, may be implemented in a similar fashion to create an elongated tubular formation within a flume or chute for the enjoyment of riders thereon.

Aerofoils may also be used upon or within a flume for rider enjoyment via fluid formations thereon. Ride lines may allow participants to use the auxiliary water flumes with the rider of a simulated natural standing wave. The rider of the simulated wave may be ejected as previously described and flow into the main flume directly in-line with the downstream area as shown in FIG. 6.

A scoring system may be used for or installed on any of the aforementioned wave forming aerofoil systems. The scoring system may comprise a number of motion sensors which, depending on their individual location of placement upon the aerofoils may send a specific signal to a scoring computer each time a rider passes thereover. After a person's ride is up and they are ejected as previously described, their combined score may then be tallied by the scoring computer. A top-10 list or other such means of keeping a record of the best riders' scores may be kept in prominent view. Such a ride scoring system utilized in conjunction with the wave forming aerofoil attractions of the present invention may add the factor of healthy competition to the ride, which in turn may add to the overall enjoyment of the participants.

A surf rider 294 may be fitted with a body or waist harness device (not shown) which would safely and comfortably allow for multiple degrees-of-movement of the surf rider while he/she rides the wave of the present invention. Such a harness may be constructed not unlike a gymnast's training harness, wherein a cord or cords are attached to stationary structures and the gymnast may practice gymnastic maneuvers safely while wearing the harness. In like fashion, a novice surf rider of the present invention may wear a multiple D.O.F. safety harness which may be attached via steel or elastomeric cords to the stationary components of the present invention. In this manner, not only may complete novices be able to attempt the sport of surfing upon the wave as created by the present invention but also advanced surfers may use such a harness system so that they may safely attempt advanced aerial stunt maneuvers upon the wave.

The invention is not limited to the specific embodiments described and illustrated herein. It will be appreciated that various modifications, substitutions, adaptations or combinations may be made without departing from the spirit and scope of the invention. For example, a toy-sized model may be provided for simulating surfing a child's action figure.

What is claimed is:

1. A rotatable surfing simulator comprising:
   a container, open at the top for holding a body of water of desired volume to support a surf craft and rider thereon;
   means for rotating said container in a given direction of rotation so as to rotate the body of water therewith in said direction of rotation, at a speed which generates an inclined surface of the body of water;
   a water-shaping aerofoil structure disposed within said container, said aerofoil structure shaping the body of water and having a leading edge, a trailing edge and a top surface; and
   wave-forming means disposed within said container adjacent said aerofoil structure and trailing said aerofoil structure with respect to the direction of rotation of said container, said wave-forming means comprising an inclined surface for forming a surfable wave from at least a portion of the body of water that has been shaped by said aerofoil structure, said inclined surface having a lower edge and an upper edge, wherein the lower edge is in closer proximity to the trailing edge of said aerofoil structure than is said upper edge so that said at least a portion of the body of water in said rotating container travels from the lower edge of said inclined surface up and over said upper edge and forms the surfable wave.

2. A rotatable surfing simulator as claimed in claim 1, further comprising means to restrain movement, in said direction of rotation, of said aerofoil structure and said wave-forming means.

3. A rotatable surfing simulator as claimed in claim 1, wherein said aerofoil structure and said wave-forming means are mounted on said container for rotation with said container.

4. A rotatable surfing simulator as claimed in claim 1, further comprising means for restraining movement, in said direction of rotation, of the surf craft and rider supported on said wave.

5. A rotatable surfing simulator as claimed in claim 1, further comprising a support container for containing the container for holding the body of water, said support container containing a second body of water that supports said container for holding the body of water.

6. A rotatable surfing simulator as claimed in claim 5, wherein at least a first portion of said container for holding the body of water includes a transparent wall or bottom, and at least a second portion of said support container includes a transparent wall or bottom, to enable spectator viewing of the surf rider in the simulator through said first and second portions.

7. A rotatable surfing simulator as claimed in claim 1, further comprising a platform, stationary with respect to the rotating container, mounted at least partially within said container, said platform having an inclined top surface that is partially submerged in said body of water and partially out of said body of water, and wherein said platform includes drainage means for allowing a flow of water to pass therethrough and return to the rotating body of water.

8. A rotatable surfing simulator as claimed in claim 1, further comprising a chute adjacent said wave-forming means and trailing said wave-forming means with respect to the direction of rotation of said container, said chute comprising an inclined surface for returning water that flows over said wave-forming means back to the bottom of said container.

9. A rotatable surfing simulator as claimed in claim 1, wherein at least a portion of said container for holding the body of water includes a transparent wall or bottom to enable spectator viewing of the surf rider in the simulator through said portion.

10. A rotatable surfing simulator as claimed in claim 1, wherein at least a portion of said wave-forming means comprises a transparent material to enable spectator viewing of a surf rider in the simulator through said material.

11. A rotatable surfing simulator as claimed in claim 1, wherein said container for holding the body of water includes a bottom and a drain grate disposed in said bottom, and means to return water drained through said drain grate back to the rotating body of water.

12. A rotatable surfing simulator as claimed in claim 1, further comprising a support container for containing the container for holding the body of water, said support container containing a second body of water that supports said container for holding the body of water, and comprising means to rotate said support container.

13. A rotatable surfing simulator as claimed in claim 12, wherein said means to rotate the support container rotates the support container in the same direction of rotation as the container for holding the body of water.

14. A rotatable surfing simulator as claimed in claim 12, wherein said means to rotate the support container rotates the support container in the opposite direction of rotation of the container for holding the body of water.

15. A rotatable surfing simulator as claimed in claim 1, further comprising a second water-shaping aerofoil structure disposed within said container, said second aerofoil structure shaping the body of water and having a leading edge, a trailing edge and a top surface; and a second wave-forming means disposed within said container adjacent said second aerofoil structure and trailing said second aerofoil structure with respect to the direction of rotation of said container, said second wave-forming means comprising an inclined surface for forming a surfable wave from water that has been shaped by said second aerofoil structure, said inclined surface having a lower edge and an upper edge, wherein the lower edge is in closer proximity to the trailing edge of said second aerofoil structure than is said upper edge so that at least a portion of the body of water in said rotating container travels from the lower edge of said inclined surface up and over said upper edge and forms the surfable wave.

16. A rotatable surfing simulator as claimed in claim 1, further comprising a stationary entrance ramp that remains stationary during rotation of said container, for enabling the surf rider to enter the container at a central portion thereof.

17. A rotatable surfing simulator as claimed in claim 1, further comprising a safety grate that extends across at least a portion of said container and divides the container into two or more sections for enabling two or more surf riders to separately simulate surfing at the same time within said container without colliding into each other.

\* \* \* \* \*